(12) United States Patent
Akamatsu

(10) Patent No.: US 11,300,903 B2
(45) Date of Patent: Apr. 12, 2022

(54) IMAGE FORMING APPARATUS, IMAGE FORMING METHOD, AND COMPUTER READABLE RECORDING MEDIUM FOR RECORDING PROGRAM THAT DETERMINES A FIXING PORTION TARGET TEMPERATURE BASED ON PRESENCE OR ABSENCE OF AN IMAGE WITH A SPECIFIC CHARACTERISTIC

(71) Applicant: CANON KABUSHIKI KAISHA, Tokyo (JP)

(72) Inventor: Takaaki Akamatsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/887,078

(22) Filed: May 29, 2020

(65) Prior Publication Data
US 2020/0379383 A1    Dec. 3, 2020

(30) Foreign Application Priority Data

May 31, 2019  (JP) .............................. JP2019-102853

(51) Int. Cl.
*G03G 15/20* (2006.01)
*G06K 15/12* (2006.01)

(52) U.S. Cl.
CPC ..... *G03G 15/2039* (2013.01); *G03G 15/2064* (2013.01); *G06K 15/12* (2013.01);
(Continued)

(58) Field of Classification Search
CPC ........... G03G 15/2039; G03G 15/2064; G03G 2215/2035; G03G 15/5054; G03G 15/2046; G03G 2215/209; G06K 15/12
See application file for complete search history.

(56) References Cited

U.S. PATENT DOCUMENTS 8,983,327 B2   3/2015 Yabuuchi et al.
10,488,793 B2  11/2019 Sako et al.
(Continued)

FOREIGN PATENT DOCUMENTS

JP    2000175029 A    6/2000
JP    2014032382 A    2/2014
(Continued)

*Primary Examiner* — Walter L Lindsay, Jr.
*Assistant Examiner* — Laura Roth
(74) *Attorney, Agent, or Firm* — Venable LLP

(57) ABSTRACT

An image forming apparatus includes a first determining portion for determining the presence of a first image with at least a first number of pixels having a density-related value of at least a predetermined value continuously arrayed in a subscanning direction, and with at least a second, greater, number of pixels having the density-related value of at least the predetermined value continuously arrayed in a main scanning direction. It also includes a second determining portion for determining a target temperature at which to maintain a fixing portion based on the presence of the first image, when a determination result indicates the presence of the first image, or based on a density-related value of a second image different from the first image, when the determination result indicates the absence of the first image. The apparatus controls power to the fixing portion to maintain its temperature at the determined target temperature.

26 Claims, 12 Drawing Sheets

(52) U.S. Cl.
    CPC ............... *G03G 2215/209* (2013.01); *G03G 2215/2035* (2013.01)

(56) References Cited

U.S. PATENT DOCUMENTS

| | | | |
|---|---|---|---|
| 2012/0315060 A1* | 12/2012 | Sugiyama | G03G 15/205 399/69 |
| 2013/0045021 A1* | 2/2013 | Yoshioka | G03G 15/5041 399/69 |
| 2015/0086230 A1* | 3/2015 | Fujimori | G03G 15/2039 399/69 |

FOREIGN PATENT DOCUMENTS

| | | |
|---|---|---|
| JP | 2016004231 A | 1/2016 |
| JP | 2018004938 A | 1/2018 |
| JP | 2019066824 A | 4/2019 |

\* cited by examiner

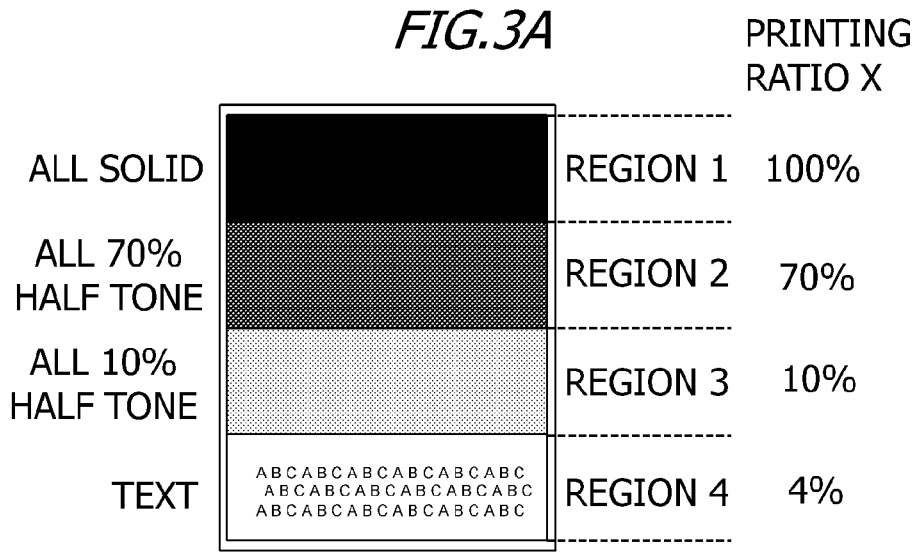
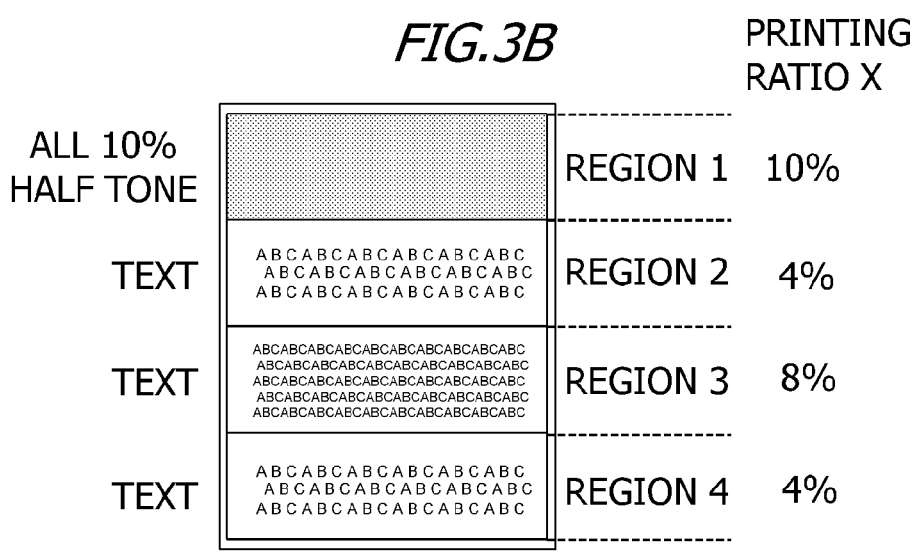
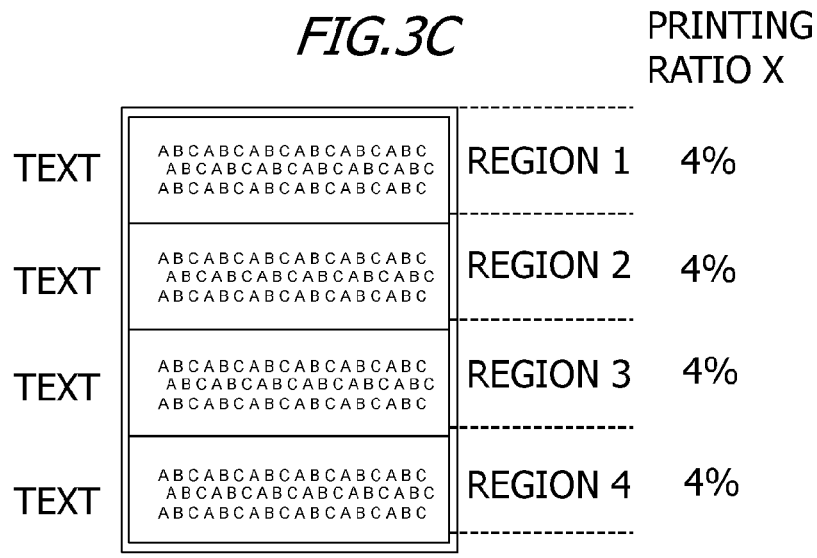

*FIG.6*

|  | IMAGE PATTERN | FIG. 5A | FIG. 5B | FIG. 5C |
|---|---|---|---|---|
| COMPARATIVE EXAMPLE 1 | TARGET TEMPERATURE (°C) | 200 | 200 | 200 |
|  | POWER CONSUMPTION (Wh) | 19.3 | 19.3 | 19.3 |
|  | TAILING | NO GOOD | NO GOOD | VERY GOOD |
|  | DATA REPRODUCIBILITY | VERY GOOD | VERY GOOD | VERY GOOD |
| COMPARATIVE EXAMPLE 2 | TARGET TEMPERATURE (°C) | 200 | 200 | 200 |
|  | POWER CONSUMPTION (Wh) | 19.3 | 19.3 | 19.3 |
|  | TAILING | VERY GOOD | VERY GOOD | VERY GOOD |
|  | DATA REPRODUCIBILITY | GOOD | GOOD | VERY GOOD |
| EMBODIMENT 1 | TARGET TEMPERATURE (°C) | 200 | 200 | 180 |
|  | POWER CONSUMPTION (Wh) | 19.3 | 19.3 | 16.3 |
|  | TAILING | VERY GOOD | VERY GOOD | VERY GOOD |
|  | DATA REPRODUCIBILITY | VERY GOOD | VERY GOOD | VERY GOOD |

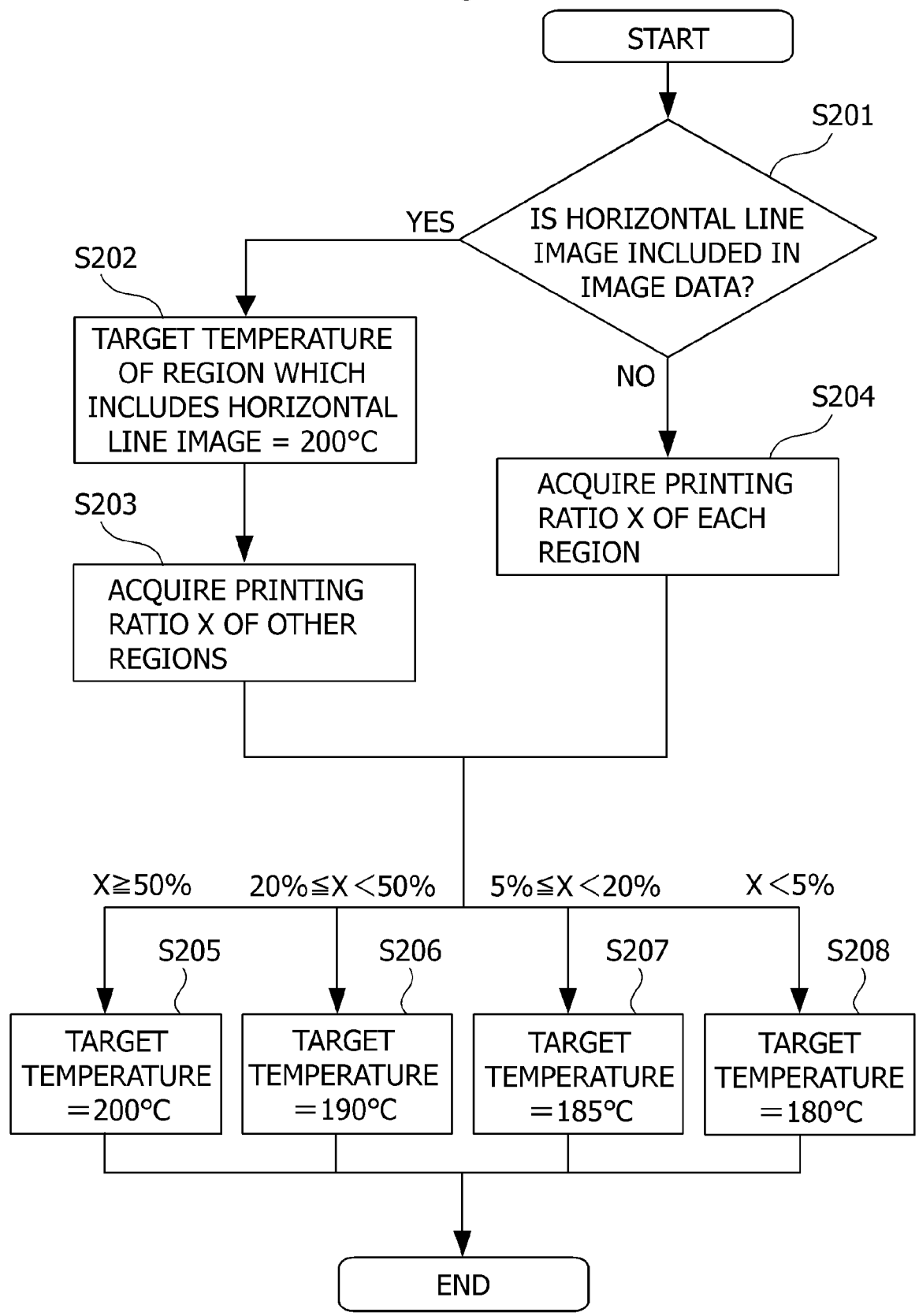

FIG.8

| EMBODIMENT 2 | IMAGE PATTERN | FIG. 5A | FIG. 5B | FIG. 5C |
|---|---|---|---|---|
| | TARGET TEMPERATURE (°C) | 200/200/185/180 | 200/200/185/185 | 180/180/180/180 |
| | POWER CONSUMPTION (Wh) | 18.0 | 18.6 | 16.3 |
| | TAILING | VERY GOOD | VERY GOOD | VERY GOOD |
| | DATA REPRODUCIBILITY | VERY GOOD | VERY GOOD | VERY GOOD |

IMAGE FORMING APPARATUS, IMAGE FORMING METHOD, AND COMPUTER READABLE RECORDING MEDIUM FOR RECORDING PROGRAM THAT DETERMINES A FIXING PORTION TARGET TEMPERATURE BASED ON PRESENCE OR ABSENCE OF AN IMAGE WITH A SPECIFIC CHARACTERISTIC

BACKGROUND OF THE INVENTION

Field of the Invention

The present invention relates to an image forming apparatus, an image forming method, and a program.

Description of the Related Art

There is a technique to optimize control of fixing temperature (target temperature) of a fixing apparatus in accordance with a toner amount of an image (hereafter "toner bearing amount") determined from image data to be printed. Japanese Patent Application Publication No. 2016-4231 discloses a method of determining the fixing temperature in accordance with the toner bearing amount. Thereby providing unnecessary energy to an image with a low toner bearing amount can be prevented, and power consumption of the image forming apparatus can be reduced.

As illustrated in FIG. 11, in the case where a line image in the main scanning direction (hereafter "horizontal line image") is printed on a recording material P, toner of a toner image that is formed in accordance with the horizontal line image may scatter toward the downstream in the subscanning direction (conveying direction) in the fixing step. An image failure caused by the phenomenon of toner being scattered (so called "tailing phenomenon") (this image failure is hereinafter called the "tailing") is more easily generated as humidity becomes higher.

As illustrated in FIG. 12, when moisture contained in a recording material P, held between a fixing roller 401 and a pressing roller 402, is explosively evaporated and becomes water vapor by a sudden temperature rise in the fixing step, toner in the toner image also scatters at this time, whereby tailing is generated. Tailing is correlated with the toner bearing amount, and is more easily generated as the toner bearing amount is higher. As a method of solving this problem, Japanese Patent Application Publication No. 2000-175029 discloses a method of reducing the toner bearing amount by skipping image regions at a predetermined ratio.

SUMMARY OF THE INVENTION

In the case of printing a horizontal line image at the fixing temperature in according with the toner bearing amount, tailing may be generated or worsen. If the generation of tailing is suppressed by the skipping processing in order to reduce the toner bearing amount on the horizontal line image, the original image data cannot be reproduced accurately.

With the foregoing in view, it is an object of the present invention to suppress the generation of trailing while maintaining the image quality of a toner image that is formed in accordance with the image data.

In order to achieve the object described above, an image forming apparatus, including:

a fixing portion configured to fix a toner image formed in accordance with image data onto a recording material;

a first determining portion configured to determine, based on the image data, presence or absence of a first image in which at least a first number of pixels each having a density-related value of at least a predetermined value are continuously arrayed in a subscanning direction which is a conveying direction of the recording material, and in which at least a second number of pixels each having the density-related value of at least the predetermined value are continuously arrayed in a main scanning direction which is orthogonal to the subscanning direction, the second number being greater than the first number;

a second determining portion configured to determine a target temperature to maintain a temperature of the fixing portion based on the presence of the first image in a case where a determination result by the first determining portion indicates the presence of the first image, or determine the target temperature to maintain the temperature of the fixing portion based on a density-related value of a second image that is different from the first image in a case where the determination result by the first determining portion indicates the absence of the first image; and a control portion configured to control power to be supplied to the fixing portion so that the temperature of the fixing portion is maintained at the target temperature.

In order to achieve the object described above, an image forming apparatus, including:

a fixing portion configured to fix a toner image formed in accordance with image data onto a recording material;

a first determining portion configured to determine, based on the image data, presence or absence of a first image in which at least a first number of pixels each having a density-related value of at least a predetermined value are continuously arrayed in a subscanning direction which is a conveying direction of the recording material, and in which at least a second number of pixels each having a density-related value of at least the predetermined value are continuously arrayed in a main scanning direction which is orthogonal to the subscanning direction, the second number being greater than the first number;

a second determining portion configured to determine a first temperature as a target temperature to maintain a temperature of the fixing portion in a case where a determination result by the first determining portion indicates the presence of the first image, or determine a second temperature as the target temperature to maintain the temperature of the fixing portion in a case where the determination result by the first determining portion indicates the absence of the first image, the second temperature being lower than the first temperature; and a control portion configured to control power to be supplied to the fixing portion, so that the temperature of the fixing portion is maintained at the target temperature.

In order to achieve the object described above, an image forming method of an image forming apparatus including a fixing portion configured to fix a toner image formed in accordance with image data onto a recording material, the image forming method including:

executing, by a computer, a first determining step of determining, based on the image data, presence or absence of a first image in which at least a first number of pixels each having density-related value of at least a predetermined value are continuously arrayed in a subscanning direction which is a conveying direction of the recording material, and in which at least a second number of pixels each having the density-related value of at least the predetermined value are continuously arrayed in a main scanning direction which is orthogonal to the subscanning direction, the second number being greater than the first number;

a second determining step of determining a target temperature to maintain a temperature of the fixing portion based on the presence of the first image in a case where a determination result in the first determining step indicates the presence of the first image, or determining the target temperature to maintain the temperature of the fixing portion based on a density-related value of a second image that is different from the first image in a case where the determination result in the first determining step indicates the absence of the first image; and a control step of controlling power to be supplied to the fixing portion so that the temperature of the fixing portion is maintained at the target temperature.

In order to achieve the object described above, an image forming method of an image forming apparatus including a fixing portion configured to fix a toner image formed in accordance with image data onto a recording material, the image forming method including:

executing, by a computer, a first determining step of determining, based on the image data, presence or absence of a first image in which at least a first number of pixels each having a density-related value of at least a predetermined value are continuously arrayed in a subscanning direction which is a conveying direction of the recording material, and in which at least a second number of pixels each having a density-related value of at least the predetermined value are continuously arrayed in a main scanning direction which is orthogonal to the subscanning direction, the second number being greater than the first number;

a second determining step of determining a first temperature as a target temperature to maintain a temperature of the fixing portion in a case where a determination result in the first determining step indicates the presence of the first image, or determining a second temperature as the target temperature to maintain the temperature of the fixing portion in a case where the determination result in the first determining step indicates the absence of the first image, the second temperature being lower than the first temperature; and a control step of controlling power to be supplied to the fixing portion so that the temperature of the fixing portion is maintained at the target temperature.

According to the present invention, the generation of tailing can be suppressed while maintaining the image quality of a toner image that is formed in accordance with the image data. Further features of the present invention will become apparent from the following description of exemplary embodiments with reference to the attached drawings.

BRIEF DESCRIPTION OF THE DRAWINGS

FIG. 3A to FIG. 3C are diagrams depicting image patterns;

FIG. 6 is a table indicating the evaluation result of Embodiment 1;

FIG. 7 is a flow chart depicting an operation procedure to determine target temperature according to Embodiment 2;

FIG. 8 is a table indicating an evaluation result of Embodiment 2;

DESCRIPTION OF THE EMBODIMENTS

Embodiments of the present invention will be described with reference to the drawings. Dimensions, materials, shapes and relative positions of components described below in the embodiments should be appropriately changed depending on the configurations and various conditions of the apparatus to which the invention is applied, and are therefore not intended to limit the scope of the invention to the following embodiments.

Embodimet 1

Embodiment 1 of the present invention will be described below.

An image forming apparatus of Embodiment 1 is an image forming apparatus that can detect the existence of a horizontal line image. A characteristic of Embodiment 1 is that the power consumption to fix a toner image, which is formed in accordance with image patterns other than horizontal line images, onto a recording material is reduced while suppressing the image failure caused by tailing of the horizontal line images. First a configuration of a main unit of the image forming apparatus according to Embodiment 1 will be described, and then a method of detecting an image pattern and target temperature control according to the present invention will be described in detail.

Configuration of Image Forming Apparatus Main Unit

Figure 9:
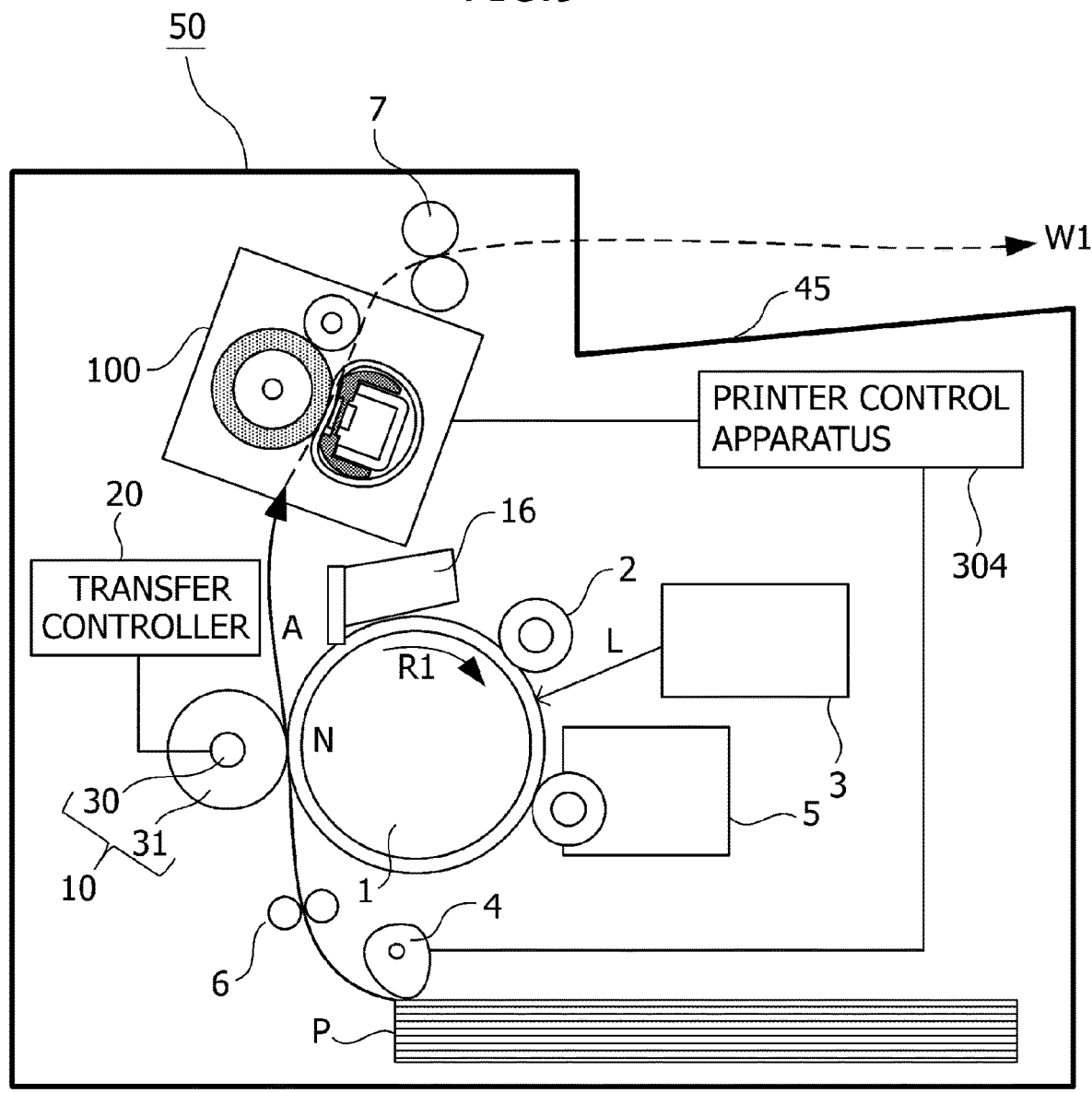
FIG. 9 is a cross-sectional view depicting a general configuration of the image forming apparatus.

An example of a method and an image forming apparatus to form an unfixed toner image on a recording material P according to Embodiment 1 will be described with reference to FIG. 9. In Embodiment 1, the image forming apparatus 50 is an image forming apparatus configured to transfer a toner image on a photosensitive drum 1 directly onto a recording material P. The image forming apparatus 50 is an electrophotographic or electrostatic recording image forming apparatus using a thermal fixing apparatus, such as a printer (e.g. laser printer, LED printer), and a digital copier. On a peripheral surface of the photosensitive drum 1, which is an image bearing member, a charging device 2, an exposing apparatus 3 which irradiates the photosensitive drum 1 with laser light L, a developing device 5, a transfer roller 10 and a photosensitive drum cleaner 16 are disposed sequentially along the rotating direction (arrow R1 direction).

First the surface of the photosensitive drum 1 is charged to minus polarity by the charging device 2. Then an electrostatic latent image is formed on the surface of the charged photosensitive drum 1 by the laser light L from the exposing apparatus 3. The surface potential increases in the exposed portion of the photosensitive drum 1. In Embodiment 1, the toner is charged to minus polarity, and minus polarity toner attaches only to the electrostatic latent image on the photosensitive drum 1 by the developing device 5 containing black toner, whereby a toner image is formed on the photosensitive drum.

When the paper feeding controller 330 supplies the recording material P using a paper feeding roller 4 of which paper feeding timing is controlled, the recording material P is conveyed to a transfer nip N by a conveying roller 6. When transfer bias having a plus polarity, which is the opposite polarity of the polarity of toner, is applied from a transfer controller 20 to the transfer roller 10, the toner image on the photosensitive drum 1 is transferred onto the recording material P at the transfer nip N. After the transfer, the untransferred toner remaining on the surface of the photosensitive drum 1 is removed by the photosensitive drum cleaner 16 which includes an elastic blade. The recording material P bearing the toner image is transferred to a heating apparatus (fixing apparatus) 100 which is adjusted to target temperature (fixing temperature) by a power controller 320, and the toner image on the recording material P is thermally fixed. The recording material P which passed through the heating apparatus 100 is sent to a paper delivery roller 7. The recording material P is sent by the paper delivery roller 7 in the arrow W1 direction in FIG. 9, and is delivered into a paper delivery tray 45.

Printer Control Apparatus

Figure 1A:
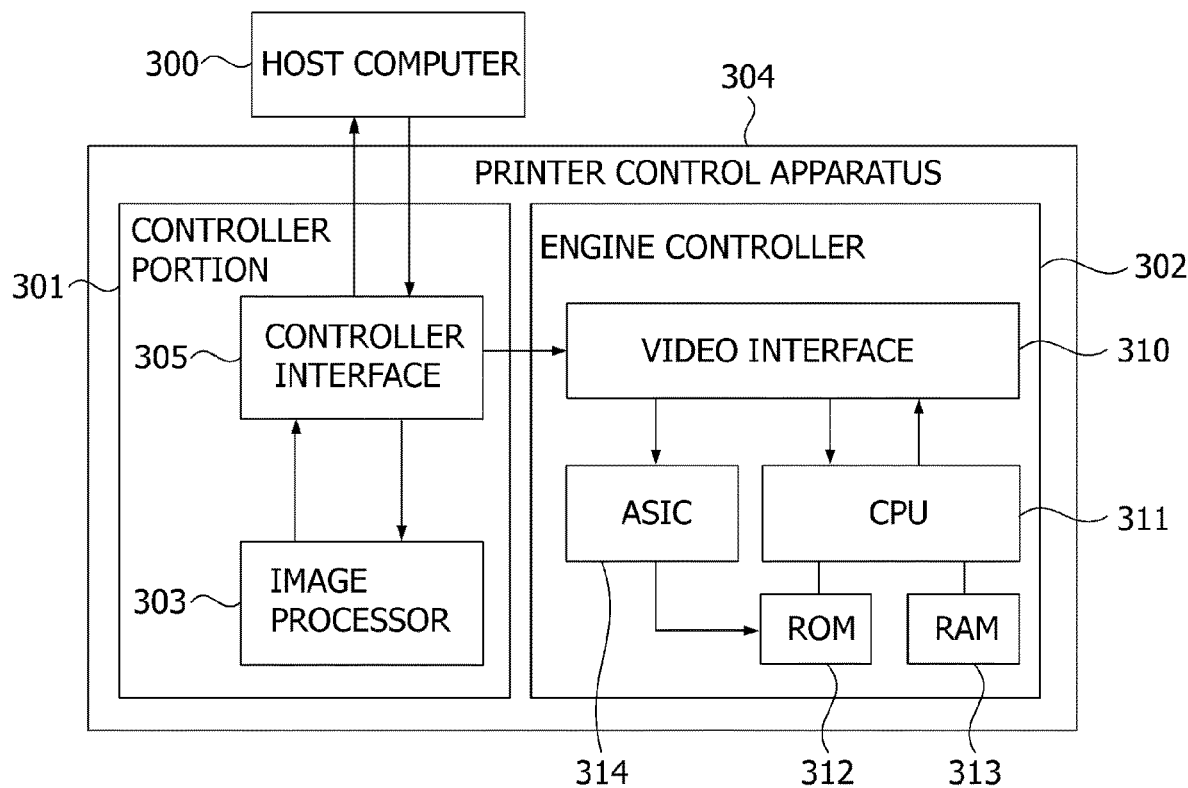
FIG. 1A is a block diagram of a printer system according to Embodiment 1.

A printer control apparatus 304 of Embodiment 1 will be described with reference to FIG. 1A. The printer control apparatus 304 is included in the image forming apparatus 50, which communicates with a host computer 300. FIG. 1A is a block diagram of a printer system (image forming system) according to Embodiment 1. The printer control apparatus 304 connects and communicates with the host computer 300 using a controller interface 305. The host computer 300 may be a server on a network (e.g. Internet, local area network (LAN)), a personal computer, or a portable information terminal (e.g. smartphone, tablet terminal). The printer control apparatus 304 communicates with the host computer 300 using the controller interface 305.

The printer control apparatus 304 is roughly divided into a controller portion 301 and engine controller 302. The controller portion 301 includes an image processor 303 and the controller interface 305. The image processor 303 performs bit mapping of a character code and half-toning processing of a grayscale image based on information received from the host computer 300 via the controller interface 305. Furthermore, the controller portion 301 sends image information to a video interface 310 of the engine controller 302 via the controller interface 305.

The controller portion 301 sends information on the lighting timing of the exposing apparatus 3 to an application specific integrated circuit (ASIC) 314. The ASIC 314 controls the exposing apparatus 3 and the like. The controller portion 301 also sends the print mode and the image size information to a central processing unit (CPU) 311. The controller portion 301 may send the information on the lighting timing of the exposing apparatus 3 to the CPU 311. The CPU 311 is also called a processor. The CPU 311 is not limited to a single processor, but may have a multi-processor configuration. The CPU 311 performs various controls of the engine controller 302 using the ROM 312 and the RAM 313. The controller portion 301 sends a print instruction, a cancel instruction or the like to the engine controller 302 in accordance with the instruction which the user initiated on the host computer 300, so as to control the print operation, such as start and stop.

Figure 1B:
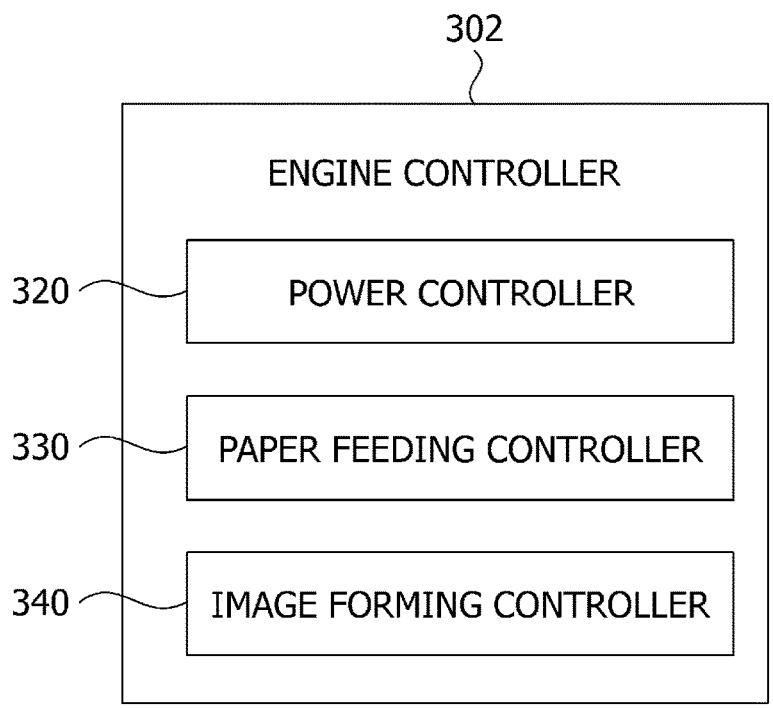
FIG. 1B is a diagram depicting an example of functional blocks of an engine controller according to Embodiment 1.

FIG. 1B is a diagram depicting an example of the functional blocks of the engine controller 302. As illustrated in FIG. 1B, the engine controller 302 includes a power controller 320, a paper feeding controller 330 and an image forming controller 340. The CPU 311 stores information in the RAM 313, uses the programs stored in the ROM 312 or the RAM 313, or refers to information stored in the ROM 312 or the RAM 313 according to necessity. By the CPU 311 performing such processing, the engine controller 302 functions as the respective controller indicated in FIG. 1B. The power controller 320 controls power to be supplied to the heating apparatus 100. The paper feeding controller 330 controls the operation intervals of the paper feeding roller 4. The image forming controller 340 performs processing speed control, development control, charging control, transfer control and the like. A part of the processing performed by the image forming apparatus 50 may be performed by the host computer 300. A part or all of the processing performed by the engine controller 302 and the image processor 303 may be performed by the host computer 300. A part or all of the processing performed by the engine controller 302 may be performed by the image processor 303, and a part or all of the processing performed by the image processor 303 may be performed by the engine controller 302.

Overview of Heating Apparatus

Figure 2:
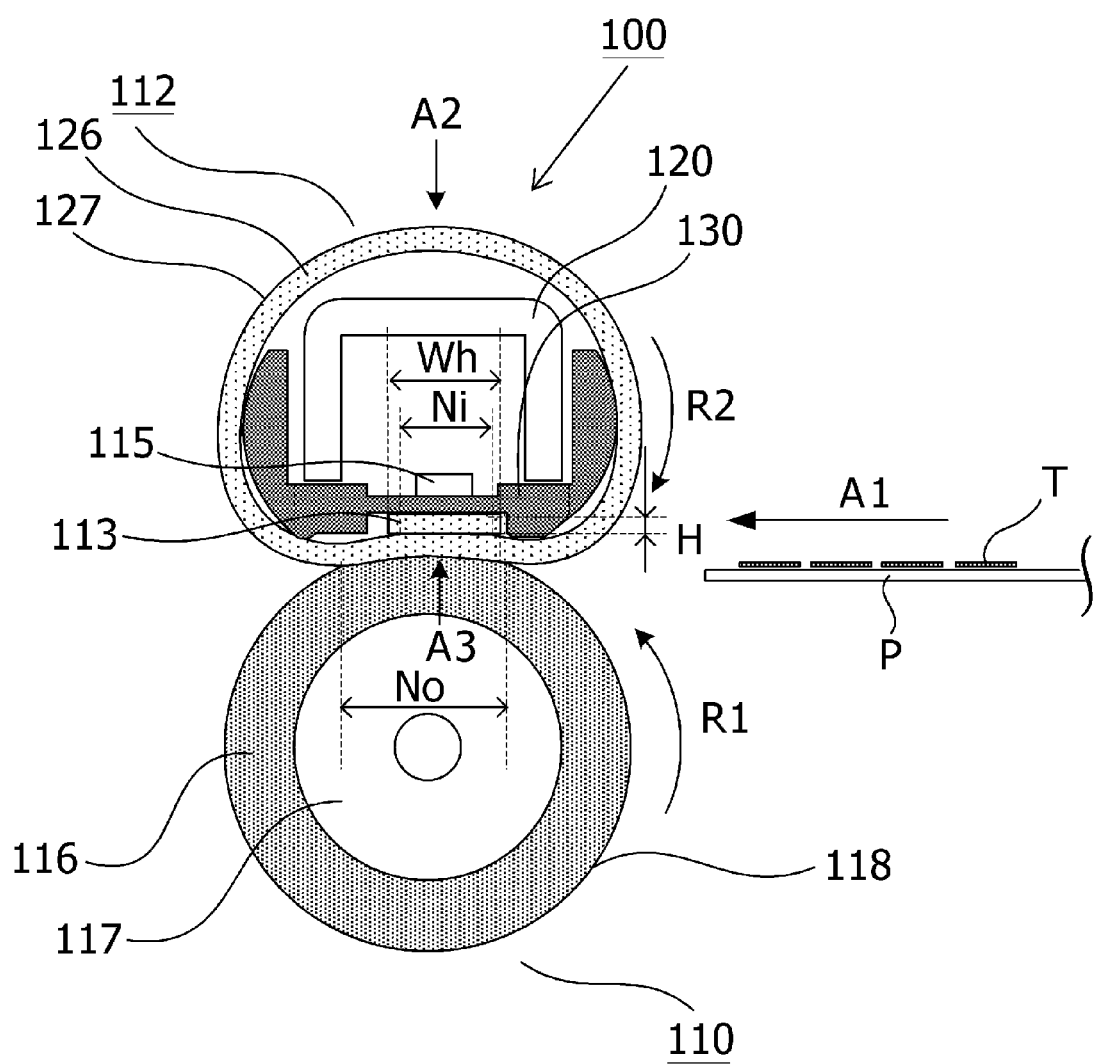
FIG. 2 is a schematic diagram depicting a state where a recording material is being conveyed to a heating apparatus.

An overview of the heating apparatus 100 of Embodiment 1 will be described next. The heating apparatus 100 of Embodiment 1 is a film heating type heating apparatus aiming at shortening the startup time and reducing power consumption. FIG. 2 is a schematic cross-sectional view depicting the heating apparatus 100 according to Embodiment 1.

As illustrated in FIG. 2, in the heating apparatus 100 of Embodiment 1, a heater 113 is held by a heater holder 130, and a cylindrical-shaped fixing film (fixing roller) 112 having flexibility surrounds the heater 113 and the heater holder 130. The heater holder 130 is preferably formed of a low thermal capacity material, so that the heat of the heater 113 is not transferred very much. In Embodiment 1, liquid crystal polymer (LCP), which is a heat resistant resin, is used for the heater holder 130. The strength of the heater holder 130 is intensified by a metal stay 120 which supports the heater holder 130 from the opposite side of the side where the heater 113 is disposed.

As illustrated in FIG. 2, the stay 120 is pressed in the arrow A2 direction in FIG. 2 from both ends in the longer direction by a pressing spring (not illustrated). As illustrated in FIG. 2, the heater 113 forms an inner surface nip Ni by contacting the inner surface of the fixing film 112, and heats the fixing film 112 from the inner side. A fixing nip No, on the other hand, is formed between the pressing roller 110 and the fixing film 112 by the heater 113 and the pressing roller 110 facing each other, with holding the fixing film 112 there between. The pressing roller 110 receives power from a drive source (not illustrated), and is driven in the arrow R1 direction in FIG. 2. When the pressing roller 110 is driven in the arrow R1 direction in FIG. 2, the fixing film 112 receives power from the pressing roller 110 at the fixing nip No, and is rotatably driven in the arrow R2 direction in FIG. 2. When the recording material P, on which the unfixed toner image T has been transferred, is conveyed into the fixing nip No in the arrow A1 direction in FIG. 2, the toner image T is fixed to the recording material P. The heating apparatus 100 is an example of the fixing portion.

Fixing Film

The fixing film 112 of Embodiment 1 has an outer diameter of φ20 mm in the cylindrical state, and has a multi-layer configuration in the thickness direction. The fixing film 112 includes a base layer 126 to maintain the strength of the film, and a release layer 127 to reduce the adhesion of contaminants to the surface. The material of the base layer 126, which receives heat from the heater 113, requires heat resistance, and also requires strength to slide on the heater 113. For the material of the base layer 126, it is preferable to use such metal material as stainless used steel (SUS) and nickel, or such heat resistant resin as polyimide.

Compared with resin, metal has strength to be reduced in thickness and has a high thermal conductivity, hence if metal is used for a material of the base layer 126, the heat of the heater 113 can be easily transferred to the surface of the fixing film 112. Compared with metal, resin has a smaller specific gravity, hence if resin is used for a material of the base layer 126, the base layer 126 is more easily warmed up since thermal capacity is small. Further, by coated-molding the resin, a thin film can be molded, and the base layer 126 can be molded at low cost. In Embodiment 1, polyimide resin is used for the material of the base layer 126 of the fixing film 112, and carbon filler is added to the polyimide resin to improve thermal conductivity and strength. As the thickness of the base layer 126 decreases, the heat of the heater 113 can be transferred to the surface of the pressing roller 110 more easily, but the strength of the base layer 126 decreases. Therefore the thickness of the base layer 126 is preferably at least 15 μm and not more than 100 μm, and in Embodiment 1, the thickness of the base layer 126 is 50 μm.

The material of the release layer 127 of the fixing film 112 is preferably a fluororesin, such as perfluoroalkoxy resin (PFA), polytetrafluoroethylene resin (PTFE) and tetrafluoroethylene-hexafluoropropylene resin (FEP). In Embodiment 1, PFA, which excels in releasability and heat resistance among fluororesins, is used for the material of the release layer 127 of the fixing film 112. The release layer 127 may be coated by a tube, but the surface thereof may be coated with paint. In Embodiment 1, the release layer 127 is molded using a coating which excels in molding thin layers. The thinner the release layer 127 the more easily the heat of the heater 113 can be transferred to the surface of the fixing film 112, but if the release layer 127 is too thin, durability is diminished. Therefore the thickness of the release layer 127 is preferably at least 5 μm and not more than 30 μm, and in Embodiment 1, the thickness of the release layer 127 is 10 μm.

Pressing Roller

The outer diameter of the pressing roller 110 of Embodiment 1 is φ20 mm, and a 4 mm thick elastic layer 116 (formed of silicon rubber foam) is disposed around a core metal 117 (φ12 mm, formed of iron). If the pressing roller 110 has a large thermal capacity and high thermal conductivity, the heat on the surface of the pressing roller 110 is easily absorbed therein, and the surface temperature of the pressing roller 110 does not rise very much. In other words, the startup time of the surface temperature of the pressing roller can be decreased if a material, of which thermal capacity and thermal conductivity are as low as possible and the heat insulation effect is high, is used for the pressing roller 110. The thermal conductivity of the foamed rubber generated by foaming silicon rubber is at least 0.1 W/m·K and not more than 0.2 W/m·K, which is lower than the thermal conductivity of solid rubber, which is at least 0.25 W/m·K and not more than 0.29 W/m·K. The specific gravity with respect to the thermal capacity of the solid rubber is about at least 1.05 and not more than 1.30, and that of the foamed rubber is about at least 0.45 and not more than 0.85 (low thermal capacity). This means that the startup time of the surface temperature of the pressing roller 110 can be decreased by using the foamed rubber for the elastic layer 116.

As the outer diameter of the pressing roller 110 is smaller, the thermal capacitance can be decreased, but if the outer diameter is too small, the width of the fixing nip No becomes narrow, hence an appropriate diameter must be chosen. In Embodiment 1, the outer diameter of the pressing roller 110 is φ20 mm. For the thickness of the elastic layer 116 as well, an appropriate thickness is required since heat is transferred to the core metal if the elastic layer 116 is too thin. In Embodiment 1, the thickness of the elastic layer 116 is 4 mm. On the elastic layer 116, a release layer 118 formed of perfluoroalkoxy resin (PFA) is disposed as a release layer of the toner. The release layer 118 may be coated by a tube or the surface thereof may be coated with paint, just like the case of the release layer 127 of the fixing film 112. In Embodiment 1, a tube which has good durability is used for the release layer 118. For the material of the release layer 118, such fluororesin as PTFE and FEP or fluororubber or silicon rubber having good releasability may be used instead of PFA. As the surface hardness of the pressing roller 110 is lower, the width of the fixing nip No can be implemented with lighter pressure, but if the surface hardness is too low, durability worsens. Therefore in Embodiment 1, the surface hardness of the pressing roller 110 is 45° in the Asker-C hardness (4.9 N load). The pressing roller 110 is rotated by a rotating unit (not illustrated) in the arrow R1 direction in FIG. 2 at a surface moving speed of 300 mm/sec.

Heater

The heater 113 of Embodiment 1 is a standard heater that is used for a film heating type heater. The heater 113 includes a ceramic substrate and a plurality of resistance heating elements which are disposed in a series on the substrate. The material used for the substrate of the heater 113 is alumina. The width Wh of the recording material P in the conveying direction on the substrate of the heater 113 is 6 mm, and the thickness H of the heater 113 is 1 mm On the surface of the substrate of the heater 113, the resistance heating elements formed of Ag/Pd (silver-palladium) are pained with a 10 μm thickness by screen printing, and a 50 μm thick glass, which is a heating element protective layer, covers the resistance heating elements. The resistance heating elements generate heat when power is supplied from an electrode portion (not illustrated) to the heater 113. On the rear surface of the heater 113, a temperature sensing element 115 is disposed to sense the temperature of the substrate of which temperature rises in accordance with the heat generated by the resistance heating elements. According to the signal outputted by the temperature sensing element 115, the power controller 320 controls the current to be supplied to the resistance heating elements appropriately, so as to control the power to be supplied to the heater 113.

The power controller 320 may sense the temperature of the heater 113 as the temperature of the heating apparatus 100. The power controller 320 may control the power to be supplied to the heating apparatus 100, so that the heating apparatus 100 is maintained at the target temperature. For example, the power controller 320 may control the power to be supplied to the heating apparatus 100 by controlling the current to be supplied to the heating apparatus 100 in accordance with the signal outputted by a temperature sensing element 115. The power controller 320 is an example of the control portion.

Image Analysis

The image analysis according to Embodiment 1 will be described next. As mentioned above, in the image forming apparatus 50 of Embodiment 1, the image processor 303 performs such processing as half-toning processing of a grayscale image on image information received from the host computer 300. At this time, along with the image processing, the image processor 303 analyzes the image data from which the toner image is formed, and determines the target temperature (fixing temperature) to maintain the temperature of the heater 113 of the heating apparatus 100 in accordance with the printing ratio (toner bearing amount) of the image data. Then the power controller 320 controls the power to be supplied to the heater 113 or the heating apparatus 100, so that the temperature of the heater 113 or the heating apparatus 100 is maintained at the target temperature.

A method of calculating the target temperature from the image data according to Embodiment 1 will be described. In Embodiment 1, the image processor 303 divides the image data into a plurality of regions (e.g. four regions) in the conveying direction (subscanning direction) of the recording material P, and calculates an average printing ratio in each region. The conveying direction of the recording material P is the subscanning direction, and is a direction orthogonal to the main scanning direction. The image processor 303 selects a region having the highest average printing ratio out of the plurality of regions, and determines the target temperature to fix the toner image on the entire surface of the recording material P based on the highest average printing ratio.

Analysis of Image Printing Ratio

A method of analyzing the image data of a recording material P will be described using specific examples of image patterns illustrated in FIG. 3A to FIG. 3C. In FIG. 3A to FIG. 3C, A4 size paper is used for the recording material P, but other sized paper may be used for the recording material P. As illustrated in FIG. 3A, the image processor 303 divides the image data into region 1 to region 4 in the conveying direction (subscanning direction) of the recording material P, and analyzes the image data for each region. The image processor 303 calculates the average printing ratio in each region, regarding the 100% printing ratio as the case where the region is filled with an image at 100% density, which is the maximum density of one pixel. For example, as illustrated in FIG. 3A, region 1 is entirely filled with an image at 100% density, hence the printing ratio of region 1 is 100%. Further, as illustrated in FIG. 3A, region 2 is filled with an image at 70% density, hence the average printing ratio in region 2 is 70%, and region 3 is filled with an image at 10% density, hence the average printing ratio in region 3 is 10%. Furthermore, as illustrated in FIG. 3A, text at 100% density is written in region 4, and the surface area of the text is 4% of the surface are of region 4. This means that the 4% region of region 4 is filled with an image at 100% density, and the average printing ratio in region 4 is therefore 4%. In this way, the image processor 303 accumulates the density data on each pixel in each region, and calculates the average printing ratio (hereafter "printing ratio X") in each region.

Calculation of Target Temperature Based on Printing Ratio

The target temperature required for fixing a toner image onto a recording material P by the heating apparatus 100 must be set to a higher temperature as the printing ratio X is higher, and to a lower temperature as the printing ratio X is lower. Table 1 indicates the correspondence between the printing ratio X (toner bearing amount) and the target temperature in the case where the thermal fixing is performed by the heating apparatus 100 of Embodiment 1.

TABLE 1

| Printing ratio X | Target temperature |
| --- | --- |
| X ≥ 50% | 200° C. |
| 20% ≤ X < 50% | 190° C. |
| 5% ≤ X < 20% | 185° C. |
| X < 5% | 180° C. |

Target Temperature Table

The image processor 303 may determine the target temperature in each region of the image data using the "target temperature table" in Table 1. As indicated in Table 1, in the case where the printing ratio X is at least 50%, the target temperature is 200° C., and in the case where the printing ratio X is less than 50%, the target temperature is lower as the printing ratio X is lower. The printing ratio X and the target temperature in the "target temperature table" in Table 1 are examples, and the range of the printing ratio X and the value of the target temperature are not limited to those indicated in Table 1.

In the case of the image pattern (print pattern) in FIG. 3A, the printing ratio X in region 1 is 100% and the printing ratio X in region 2 is 70%, hence the image processor 303 determines that the target temperature of region 1 and that in region 2 are 200° C. Further, in the case of the image pattern in FIG. 3A, the printing ratio X in region 3 is 10%, hence the image processor 303 determines that the target temperature in region 3 is 185° C. The printing ratio X in region 4, on the other hand, is 4%, hence the image processor 303 determines that the target temperature in region 4 is 180° C. In Embodiment 1, the target temperature to fix the toner image on the entire surface of the recording material P is constant, therefore the image processor 303 selects the highest target temperature out of regions 1 to 4. In the case of FIG. 3A, the target temperature 200° C. in region 1 and region 2 is the highest, which means that the target temperature in the entire region is determined to be 200° C. In the same manner, for the image patterns (print patterns) in FIG. 3B and FIG. 3C as well, the image processor 303 calculates the printing ratio X in each region, and determines the target temperature based on the printing ratio X in each region. The target temperature of each image pattern in FIG. 3A to FIG. 3C is calculated as indicated in Table 2 below.

TABLE 2

| | FIG. 3A | | FIG. 3B | | FIG. 3C | |
| --- | --- | --- | --- | --- | --- | --- |
| | Printing ratio X | Target temperature | Printing ratio X | Target temperature | Printing ratio X | Target temperature |
| Region 1 | 100% | 200° C. | 10% | 185° C. | 4% | 180° C. |
| Region 2 | 70% | 200° C. | 4% | 180° C. | 4% | 180° C. |
| Region 3 | 10% | 185° C. | 8% | 185° C. | 4% | 180° C. |

TABLE 2-continued

|  | FIG. 3A | | FIG. 3B | | FIG. 3C | |
|---|---|---|---|---|---|---|
|  | Printing ratio X | Target temperature | Printing ratio X | Target temperature | Printing ratio X | Target temperature |
| Region 4 | 4% | 180° C. | 4% | 180° C. | 4% | 180° C. |
| Entire region |  | 200° C. |  | 185° C. |  | 180° C. |

In the case of the image pattern in FIG. 3B, the target temperature 185° C. in region 1 and region 3 is the highest, which means that the target temperature in the entire region is determined to be 185° C. In the case of the image pattern in FIG. 3C, the printing ratio X is 5% or less in all regions, hence the target temperature in the entire region is determined to be 180° C. In this way, the image processor 303 analyzes the received image data, and determines the target temperature in accordance with the printing ratio (toner bearing amount) of the image data. In Embodiment 1, the image processor 303 selects the highest target temperature determined based on the printing ratio X in each region of the image data, and determines this target temperature as the target temperature in the entire region of the image data.

In the case where toner, that can be fixed at a lower temperature than conventional toner, is used to reduce energy consumption, and the horizontal line image is printed at the target temperature in accordance with the printing ratio (toner bearing amount) of the image data, tailing may be generated or worsen. This case will be described in detail with reference to FIG. 10A and FIG. 10B.

Figure 10A:
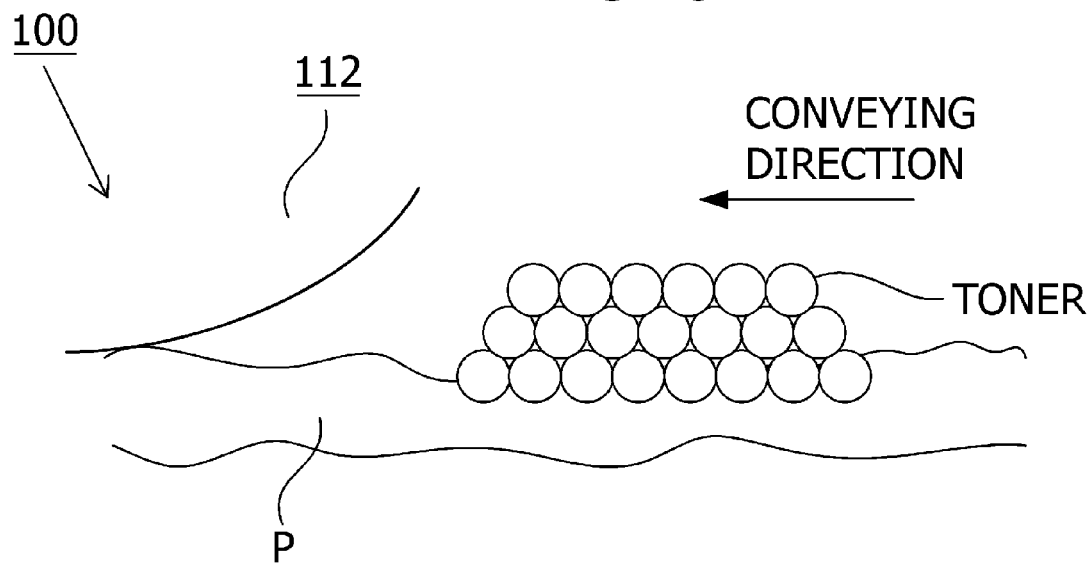
FIG. 10A and FIG. 10B are schematic diagrams for explaining tailing.

FIG. 10A is a schematic diagram depicting a toner image of a horizontal line image formed on the recording material P before entering the heating apparatus 100. The toner particles on the recording material P (unfixed toner image) are held on the recording material P in a stable state by a cohesive force generated by the uneven distribution of the charging state inside the toner particles and by the function of the Van der Waals force that acts between the toner particles and the recording material P.

Figure 10B:
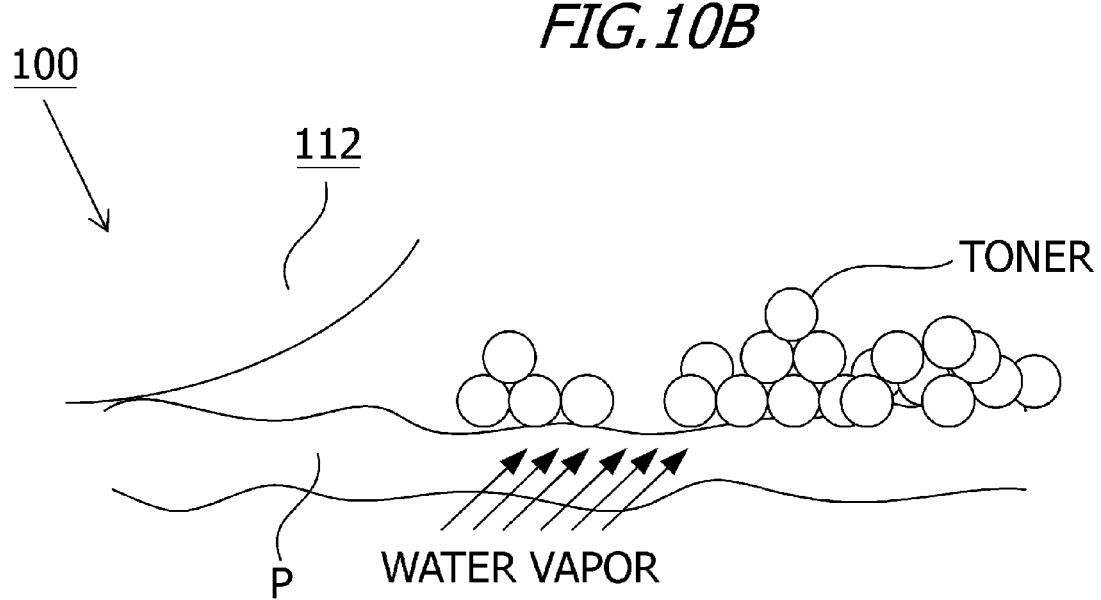
Figure 11:
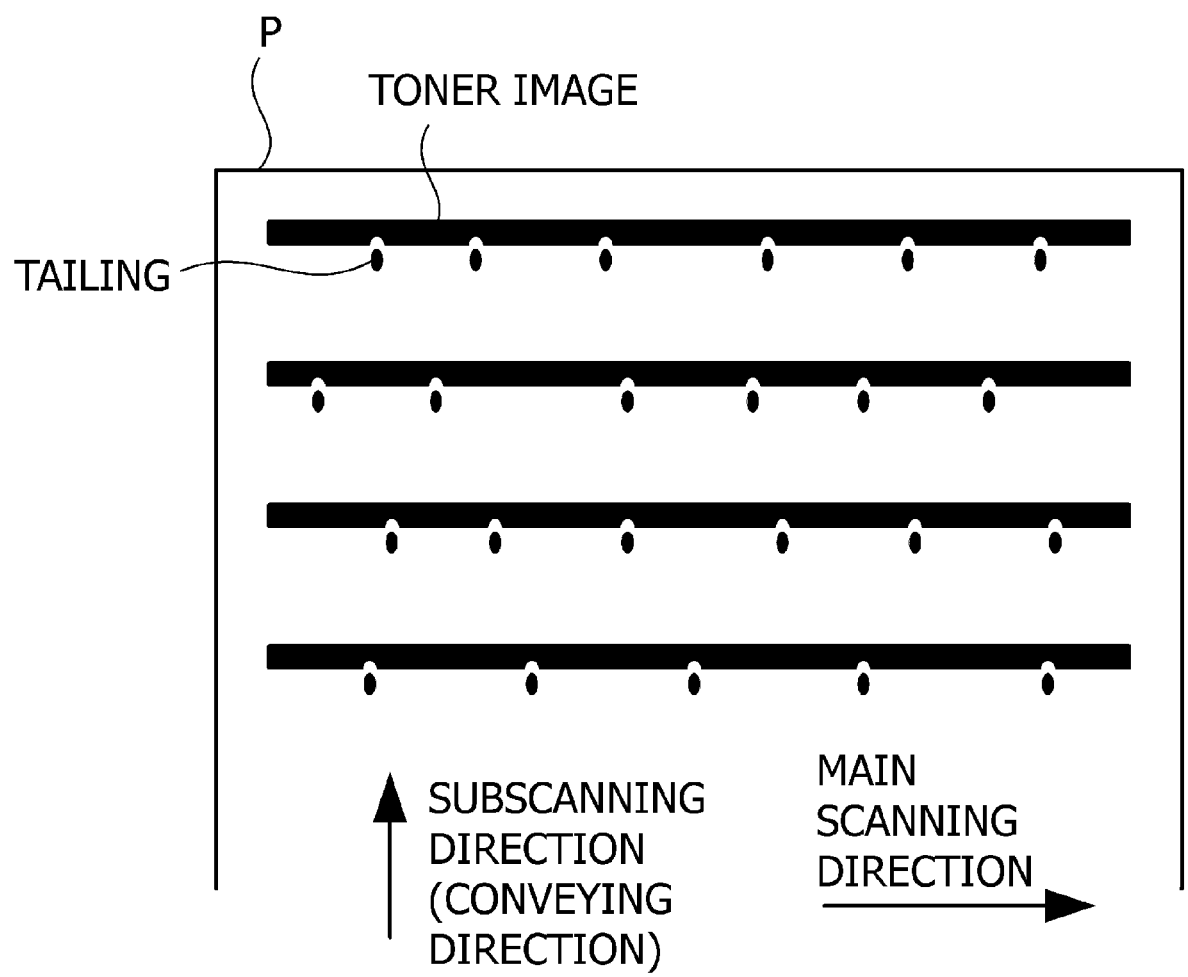
FIG. 11 is a schematic diagram for explaining tailing.
Figure 12:
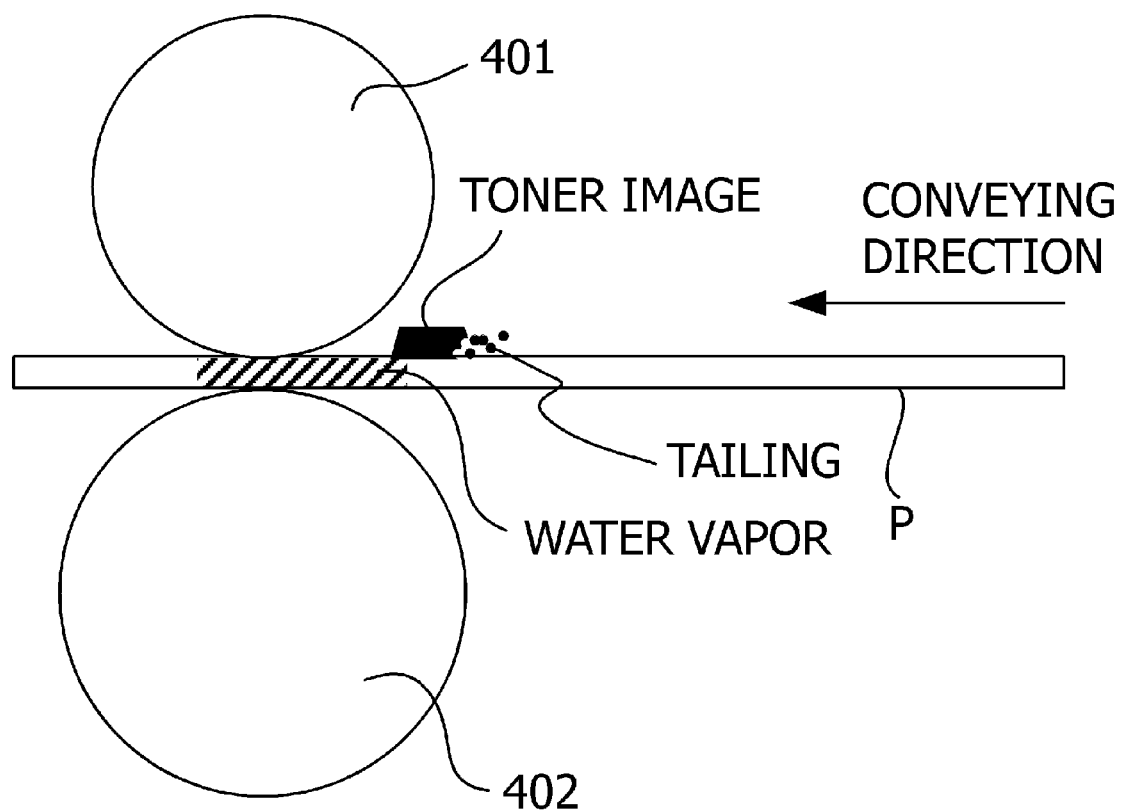
FIG. 12 is a schematic diagram for explaining tailing.

FIG. 10B is a schematic diagram for explaining the state where tailing is generated. As illustrated in FIG. 10B, when the toner image enters the heating apparatus 100, the toner particles are subject to the influence of an external force of water vapor, which is generated by the heat from the heating apparatus 100. Tailing is generated when the external force of this water vapor exceeds the holding force that acts on the toner particles, which was described above. It is known that the tailing tends to improve if the target temperature is decreased. This is probably because the fixing temperature of toner, which is normally used, is sufficiently high compared with the temperature at which water vapor is generated from the recording material P, and the influence of the external force of the water vapor can be weakened by decreasing the target temperature.

On the other hand, as the melting point of toner becomes lower and the temperature of the recording material P, when the recording material P passes through the heating apparatus 100, becomes lower as well, a drop in the target temperature may worsen the tailing, unlike the above mentioned case. This case of the worsening of tailing will be described here. If the temperature of the recording material P, when the recording material P passes through the heating apparatus 100, becomes low, the amount of water vapor generated from the recording material P decreases considerably. Therefore the external force of the water vapor that the toner particles receive decreases in general. On the other hand, the toner of which melting point is low is easily softened by heat from the heating apparatus 100, and the binding force between toner particles, for example, becomes higher as the fixing temperature of the toner becomes higher. That is, the binding force between toner particles decreases as the target temperature decreases. Therefore by decreasing the target temperature, the external force of the water vapor exceeds the holding force that acts on the toner particles, and tailing worsens as a result.

In the horizontal line image, the tailing tends be generated more easily since the heat of the toner image, when the toner image is fixed to the recording material P, is not easily diffused in the subscanning direction. Further, if the plurality of resistance heating elements of the heater 113 are arrayed in a direction orthogonal to the conveying direction of the recording material P (arrayed in the longer direction of the heater 113), the tailing tends to be generated more easily.

Method of Detecting Horizontal Line Image of Embodiment 1

Tailing tends to be generated more easily when the toner image, of which line width in the subscanning direction is 120 to 380 μm and the line width in the main scanning direction is at least 5 mm, is fixed to the recording material P. In the case of printing at 600 dpi, tailing tends to be generated more easily when the toner image, of which number of pixels in the subscanning direction is 3 to 9 (dots) and a number of pixels in the main scanning direction is at least 120 (dots), is fixed to the recording material P. In Embodiment 1, the image processor 303 detects the horizontal line image, which extends in the main scanning direction, in the image data. The image processor 303 detects the horizontal line image that satisfies a predetermined condition in the image data. In concrete terms, the image processor 303 determines whether the horizontal line image included in the image data satisfies the predetermined conditions. The predetermined condition is, for example, the condition that 3 to 9 pixels each having a density of at least a predetermined value are continuously arrayed in the subscanning direction, with the upper left coordinates of the horizontal line image as a reference, and at least 120 pixels each having the density of at least the predetermined value are continuously arrayed in the main scanning direction. In the horizontal line image that satisfies the predetermined condition, at least a first number (such as 3) of pixels each having a density of at least a predetermined value are continuously arrayed in the subscanning direction, and at least a second number (a number greater than the first number, such as 120) of pixels each having the density of at least the predetermined value are continuously arrayed in the main scanning direction. The density of the pixel may be expressed by a numeric value in the 0 to 255 range, or by a density-related value, such as a percentage (0% to 100%). For example, the predetermined value in the predetermined condition may be 50%. That is, the density of a pixel in the horizontal line image may be at least 50%. If the density of a pixel in the horizontal line image is less than 50%, tailing caused by the horizontal line image is no longer visually recognized. The predetermined condition may be the condition that 3 to 9 pixels (dots) each having a density of at least 50% are continuously arrayed in the subscanning direction, and 120 pixels (dots) each having a density of at least 50% are continuously arrayed in the main scanning direction. The density of the pixel in the horizontal line image is not limited to the aforementioned values, and may be set in the range of at least 50% and not more than 100%. In this way, the image processor 303 determines whether a horizontal line image is included in the image data, based on a number of pixels having a density of at least a predetermined value, which are continuously arrayed in the main scanning direction, and a number of pixels having a density of at least the predetermined value, which are continuously arrayed in the subscanning direction. If the horizontal line image included in the image data satisfies the predetermined condition, the image processor 303 determines that a horizontal line image is included in the image data, and detects the horizontal line image in the image data. The horizontal line image that satisfies the predetermined condition may be connected to another image other than a horizontal line image, or may be separate from other images. For example, in the case where 20 pixels of a horizontal line image are continuously arrayed in the subscanning direction, the horizontal line image does not satisfy the predetermined condition, therefore this horizontal line image that does not satisfy the predetermined condition is not extracted from the image data. For example, in the case where a plurality of horizontal line images are connected stepwise, that is, in the case where a plurality of horizontal line images are arrayed in the diagonal direction, the horizontal line image is extracted from the image data when at least one of the plurality of horizontal line images satisfies the predetermined condition.

The horizontal line image used for detection may be stored in a memory (storage portion), such as a ROM 312 and a RAM 313. The image processor 303 may detect a horizontal line image that satisfies the predetermined condition in the image data by comparing the horizontal line image for detection, which is stored in the memory, and an image included in the image data. In other words, the image processor 303 may perform pattern matching for the image data using the horizontal line image for detection, which is stored in the memory, and detect the horizontal line image that satisfies the predetermined condition in the image data. The horizontal line image included in the image data may be connected to another image other than a horizontal line image, or may be separate from images other than a horizontal line image.

Figure 4:
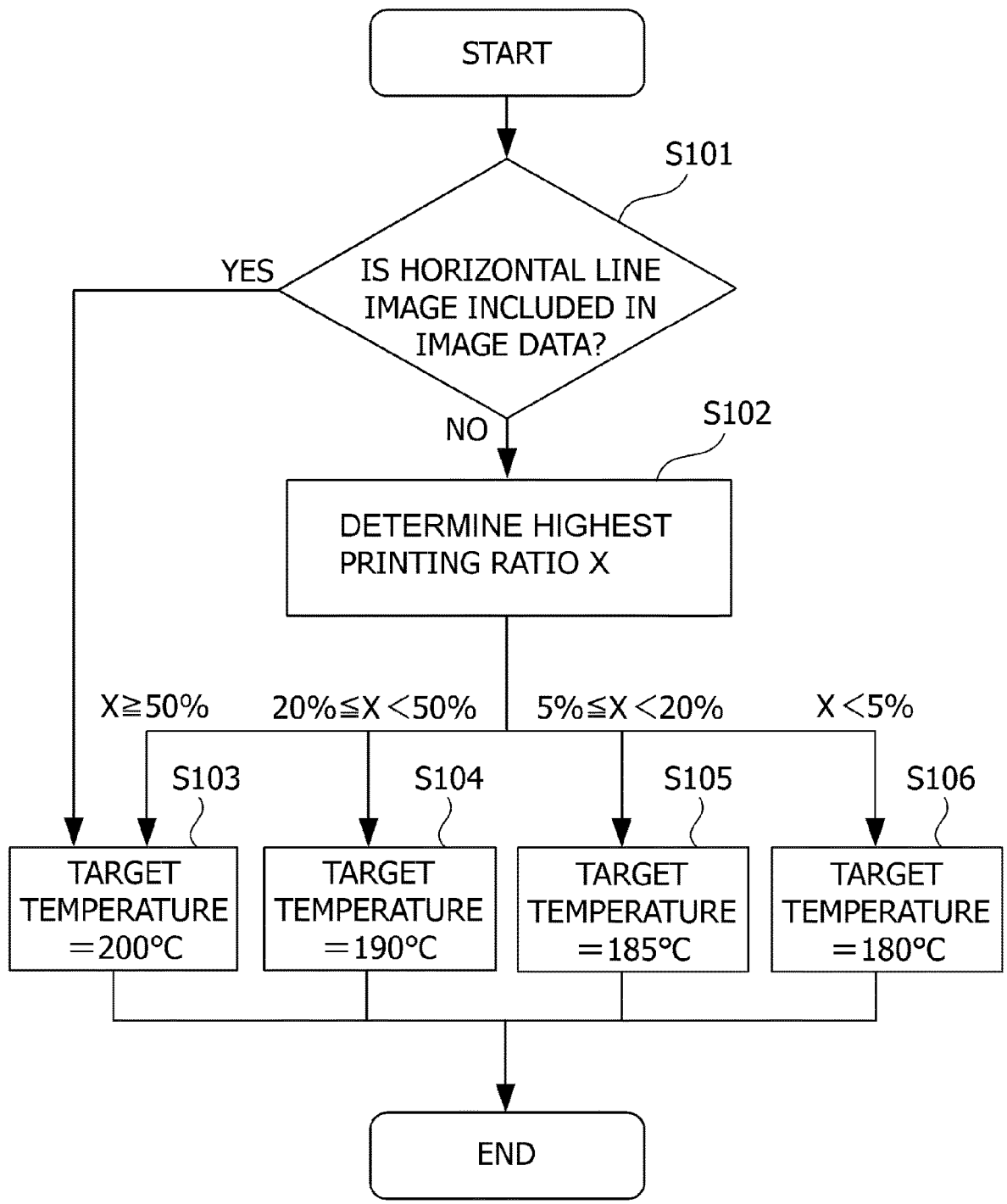
FIG. 4 is a flow chart depicting an operation procedure to determine target temperature according to Embodiment 1.

FIG. 4 is a flow chart depicting an operation procedure to determine the target temperature in the image forming apparatus 50 according to Embodiment 1. As described above with reference to FIG. 1, the image processor 303 performs bit map processing of a character code, half-tone processing of a grayscale image and the like. The image processor 303 determines whether the horizontal line image that satisfies the predetermined condition is included in the image data received from the host computer 300 (S101). The image processor 303 is an example of the first determining portion. If a horizontal line image that satisfies the predetermined condition is included in the image data, the image processor 303 determines that the target temperature is 200° C., which is the maximum temperature (S103). The image processor 303 is an example of the second determining portion.

If a horizontal line image that satisfies the predetermined condition is not included in the image data, on the other hand, the image processor 303 determines the highest printing ratio X out of the printing ratios X in each region of the image data (S102). The image processor 303 determines the target temperature based on the highest printing ratio X. If the highest printing ratio X is at least 50%, the image processor 303 determines that the target temperature is 200° C. (S103). If the highest printing ratio X is at least 20% and less than 50%, the image processor 303 determines that the target temperature is 190° C. (S104). If the highest printing ratio X is at least 5% and less than 20%, the image processor 303 determines that the target temperature is 185° C. (S105). If the highest printing ratio X is less than 5%, the image processor 303 determines that the target temperature is 180° C. (S106). In this way, the image processor 303 determines whether a horizontal line image that satisfies the predetermined condition is included in the image data, and determines the target temperature based on the determination result.

An example of processing by the image processor 303 according to Embodiment 1 will be described. Based on the image data, the image processor 303 determines the presence or absence of a horizontal line image that satisfies the predetermined condition (first image). The image processor 303 determines the target temperature based on the result of determining that a horizontal line image that satisfies the predetermined condition is present. For example, the image processor 303 determines that the target temperature is 200° C. which is the maximum temperature. Further, the image processor 303 determines the target temperature based on the result of determining that a horizontal line image that satisfies the predetermined condition is absent. The image processor 303 may determine the target temperature based on a density-related value (e.g. printing ratio or toner bearing amount) of another image (second image) that is different from the horizontal line image (first image).

An example of the processing by the image processor 303 according to Embodiment 1 will be described. Based on the image data, the image processor 303 determines the presence or absence of a horizontal line image that satisfies the predetermined condition (first image). In the case where it is determined that a horizontal line image that satisfies the predetermined condition is present, the image processor 303 determines that the target temperature is the first temperature (e.g. 200° C.). In a case where it is determined that a horizontal line image that satisfies the predetermined condition is absent, the image processor 303 may determine that the target temperature is a second temperature (e.g. 190° C.) which is lower than the first temperature (e.g. 200° C.). For example, in the case where the highest printing ratio X, out of the printing ratios X of each region of the image data, is at least 20% and not more than 50%, the image processor 303 determines that the target temperature is 190° C.

Power Control of Embodiment 1

The power controller 320 controls power to be supplied to the heater 113 or the heating apparatus 100 based on the target temperature. The power controller 320 controls power to be supplied to the heater 113 or the heating apparatus 100, so that the temperature of the heater 113 or the heating apparatus 100 is maintained at the target temperature.

Image Patterns Evaluated in Embodiment 1

Figure 5A:
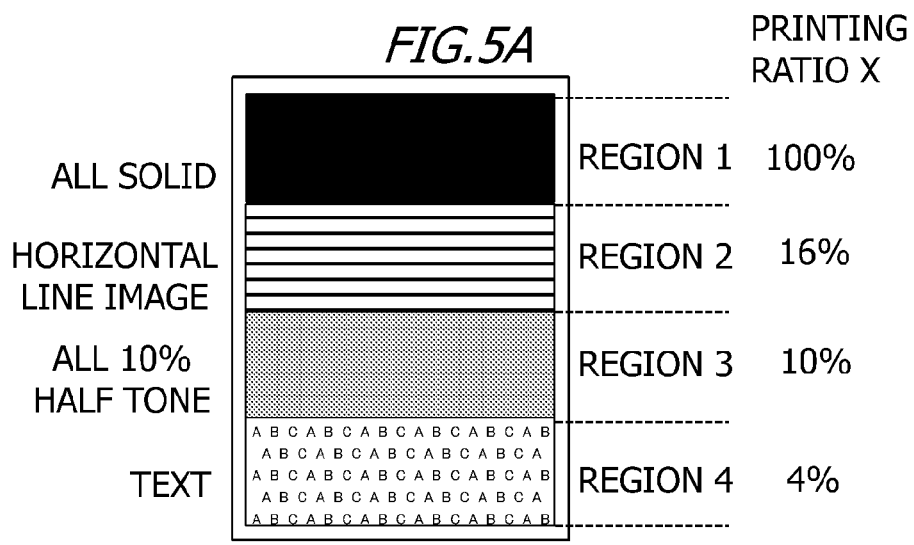
FIG. 5A to FIG. 5C are diagrams depicting image patterns.
Figure 5B:
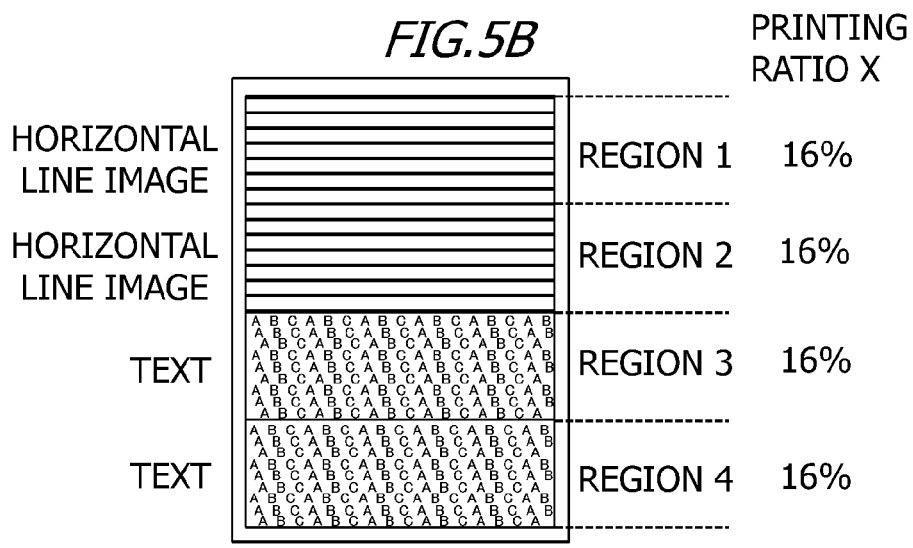
Figure 5C:
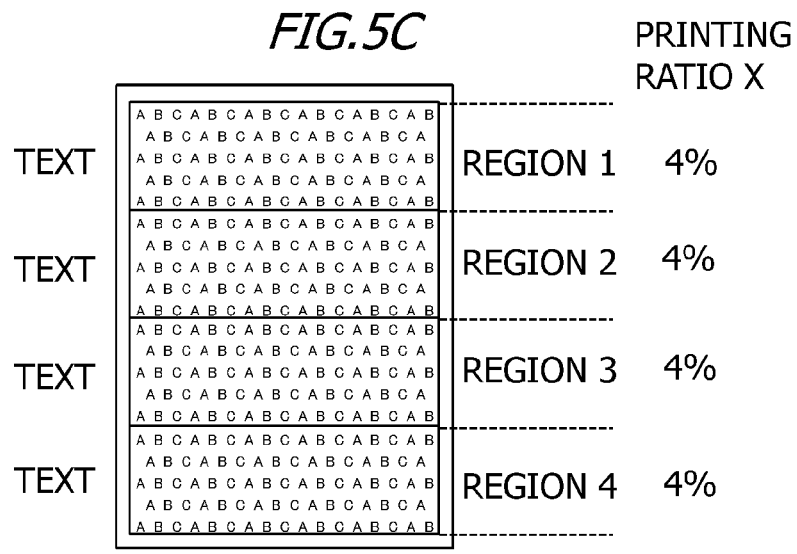

FIG. 5A to FIG. 5C indicate three types of image patterns (print patterns) evaluated in Embodiment 1. First the image pattern in FIG. 5A will be described. In region 1 in FIG. 5A, the entire region is filled with the image at 100% density. The printing ratio X in region 1 is 100%. In region 2 in FIG. 5A, a horizontal line image at 100% density is repeatedly disposed at equal intervals (21 pixels) in the subscanning direction. The horizontal line image in region 2 includes four pixels which are continuously arrayed in the subscanning direction, and at least 120 pixels which are continuously arrayed in the main scanning direction. The printing ratio X in region 2 is 16%. In region 3 in FIG. 5A, the entire image is filled with an image at 10% density. The printing ratio X in region 3 is 10%. In region 4 in FIG. 5A, text at 100% density is written in the entire region. The printing ratio X in region 4 is 4%.

The image pattern in FIG. 5B will be described next. In region 1 and region 2 in FIG. 5B, the horizontal line image at 100% density is repeatedly disposed at equal intervals (21 pixels) in the subscanning direction. The horizontal line image in region 1 and region 2 includes four pixels which are continuously arrayed in the subscanning direction, and at least 120 pixels which are continuously arrayed in the main scanning direction. The printing ratio X in region 1 and that in region 2 are both 16%. In region 3 and region 4 in FIG. 5B, text at 100% density is written in the entire region. The printing ratio X in region 3 and that in region 4 are both 16%. Finally the image pattern in FIG. 5C will be described. In regions 1 to 4 in FIG. 5C, text at 100% density is written in the entire region. The printing ratio X in each of region 1 to 4 is 4%.

Fixing Control of Embodiment 1

The fixing control in the cases of FIG. 5A to FIG. 5C according to Embodiment 1 will be described with reference to the above mentioned flow chart in FIG. 4. In the case of the image pattern in FIG. 5A, the image in region 2 is detected as a horizontal line image that satisfies the predetermined condition, hence it is determined that the target temperature is 200° C., which is the maximum temperature. In the case of the image pattern in FIG. 5B, the image in region 1 and region 2 is detected as a horizontal line image that satisfies the predetermined condition, hence it is determined that the target temperature is 200° C., which is the maximum temperature. In the case of the image pattern in FIG. 5C, the images in regions 1 to 4 are text images, and the printing ratio X of each text image in regions 1 to 4 is 4% respectively. Therefore it is determined that the target temperature in accordance with the printing ratio X in each region 1 to 4 of the image pattern in FIG. 5C is 180° C.

Evaluation Method of Embodiment 1

The three types of image patterns in FIG. 5A to FIG. 5C are printed 60 prints respectively, and the generation state of tailing and the power consumption in this case were confirmed. To measure the power consumption, power consumed by the heater 113 of the heating apparatus 100 alone was measured by a power meter after 60 prints were printed continuously, and the integral power was regarded as the power consumption. The evaluation environment is a room temperature of 30° C. and a humidity of 80% RT. Further, in order to evaluate the deterioration of an image influenced by the skipping processing of the original data (hereafter "data reproducibility") performed in the later mentioned Comparative Example 2 image quality other than the tailing was also confirmed in the printed toner image.

Description on Comparative Example 1 and Comparative Example 2

Image forming apparatuses according to Comparative Example 1 and Comparative Example 2 will be described next. The image forming apparatus according to Comparative Example 1 is an image forming apparatus of which target temperature is set to 200° C., regardless the toner bearing amount (printing ratio) of the image, and in which the skipping processing is not performed on the image data. The image forming apparatus according to Comparative Example 2 (prior art) is an image forming apparatus of which target temperature is set to 200° C., regardless the toner bearing amount (printing ratio) of the image, and in which the skipping processing is performed on the image data in order to suppress the generation of tailing.

Evaluation Result of Embodiment 1

FIG. 6 is an evaluation result of Comparative Example 1 and Comparative Example 2. In FIG. 6, the result is better in the sequence of "VERY GOOD" and "GOOD", with "NO GOOD" indicating the worst result. In the case of Comparative Example 1, in the image patterns in FIG. 5A and FIG. 5B, tailing was generated but data reproducibility is good. In the case of Comparative Example 2, in the image patterns in FIG. 5A and FIG. 5B, the generation of tailing is suppressed, but data reproducibility is not good. According to Embodiment 1, in the image patterns in FIG. 5A and FIG. 5B, the generation of tailing is suppressed and data reproducibility is good. According to Embodiment 1, compared with Comparative Example 1 and Comparative Example 2, the generation of tailing can be suppressed while maintaining a high reproducibility of original data for an image pattern that includes a horizontal line image. Further, according to Embodiment 1, compared with Comparative Example 1 and Comparative Example 2, power consumption can be suppressed for an image pattern that does not include a horizontal line image.

In Embodiment 1, in the case where a horizontal line image is included in the image data, the image processor 303 determines a target temperature (second predetermined temperature) that is higher than a target temperature (first predetermined temperature) determined based on the printing ratio (toner bearing amount) of the image data that includes the horizontal line image. The reason why tailing of the horizontal line image improves by determining the target temperature (second predetermined temperature) that is higher than the target temperature (first predetermined temperature) determined based on the printing ratio (toner bearing amount) of the image data that includes a horizontal line image, will be described next. As mentioned above, when the melting point of toner becomes lower and the temperature of the recording material P in the fixing processing becomes lower as well, the water vapor amount generated from the recording material P decreases considerably. Thereby the external force of the water vapor applied to the toner particles decreases in general. On the other hand, the toner of which melting point is low is easily softened by the heat received from the heating apparatus 100, and the binding force between toner particles, for example, increases as the fixing temperature of the toner is higher. In other words, in the state where the water vapor amount from the recording material P is low, the generation of tailing tends to decrease as the target temperature is higher.

According to Embodiment 1, in the case where a horizontal line image is included in image data, a target temperature which is higher than the target temperature in accordance with the printing ratio (toner bearing amount) of the image data that includes the horizontal line image, is determined. Thereby the generation of tailing can be suppressed while maintaining the image quality of the toner image formed in accordance with the image data, even if toner that allows fixing at a lower temperature (low melting point toner) is used. Further, in Embodiment 1, the image processor 303 determines a target temperature based on the printing ratio of the image data in the case where a horizontal line image is not included in the image data. Thereby the power consumption when the toner image, which is formed in accordance with image patterns other than a horizontal line image, is fixed to the recording material P, can be reduced.

Embodimet 2

Embodiment 2 of the present invention will be described below. In Embodiment 1, a configuration of the image forming apparatus 50, that fixes the recording material P at the same fixing temperature for the entire surface, was described. A characteristic of a configuration of an image forming apparatus 50 of Embodiment 2 is that further reduction of the power consumption is attempted by changing the target temperature in accordance with the change of printing ratio of the image data in the conveying direction. The configuration itself of the image forming apparatus 50 according to Embodiment 2 is the same as that of the image forming apparatus 50 according to Embodiment 1, hence in Embodiment 2, a function or composing element the same as or equivalent to that of the image forming apparatus 50 of Embodiment 1 is denoted with the same reference symbol, and a detailed description thereof is omitted.

Method of Detecting Horizontal Line Image of Embodiment 2

In Embodiment 2 as well, just like Embodiment 1, the image processor 303 detects a horizontal line image that satisfies a predetermined condition in the image data. The predetermined condition is, for example, the condition that 3 to 9 pixels each having a density of at least a predetermined value are continuously arrayed in the subscanning direction, with the upper left coordinates of the horizontal line image as a reference, and at least 120 pixels each having the density of at least the predetermined value are continuously arrayed in the main scanning direction.

The horizontal line image used for detection may be stored in memory (storage portion), such as s ROM 312 or a RAM 313. The image processor 303 may detect a horizontal line image that satisfies the predetermined condition in the image data by comparing the horizontal line image for detection, which is stored in memory, and the image included in the image data. In other words, the image processor 303 may perform pattern matching for the image data using the horizontal line image for detection, which is stored in memory, and detect a horizontal line image that satisfies the predetermined condition in the image data.

FIG. 7 is a flow chart depicting an operation procedure to determine the target temperature in the image forming apparatus 50 according to Embodiment 2. As described above with reference to FIG. 1, the image processor 303 performs bit map processing on a character code, half-tone processing of a grayscale image and the like. The image processor 303 determines whether a horizontal line image that satisfies the predetermined condition is included in the image data received from the host computer 300 (S201). The image processor 303 is an example of the first determining portion. In the case where a horizontal line image that satisfies the predetermined condition is included in the image data, the image processor 303 determines that the target temperature in the region which includes the horizontal line image that satisfies the predetermined condition is 200° C.(S202). The image processor 303 is an example of the second determining portion. In the case where a plurality of regions include a horizontal line image that satisfies the predetermined condition, the image processor 303 determines that the target temperature of the plurality of regions which includes a horizontal line image that satisfies the predetermined condition is 200° C. The flow chart in FIG. 7 ends in the case where all the regions include a horizontal line image that satisfies the predetermined condition. Then the image processor 303 acquires the printing ratio X in the other regions which do not include a horizontal line image that satisfies the predetermined condition (S203). Then the image processor 303 determines the target temperature in accordance with the printing ratio X in the other regions which do not include a horizontal line image that satisfies the predetermined condition.

If the printing ratio X is at least 50%, the image processor 303 determines that the target temperature is 200° C. (S205). If the printing ratio X is at least 20% and less than 50%, the image processor 303 determines that the target temperature is 190° C. (S206). If the printing ratio X is at least 5% and less than 20%, the image processor 303 determines that the target temperature is 185° C. (S207). If the highest printing ratio X is less than 5%, the image processor 303 determines that the target temperature is 180° C. (S208). On the other hand, in the case where the image data does not include a horizontal line image that satisfies the predetermined condition, the image processor 303 acquires the printing ratio X in each region of the image data (S204). Then the image processor 303 determines the target temperature in accordance with the printing ratio X in each region (S205 to S208). In this way, the image processor 303 determines whether the horizontal line image that satisfies the predetermined condition is included in each of the plurality of regions generated by dividing the image data in the sub-scanning direction, and determines the target temperature for each of the plurality of regions based on the determination result.

Power Control of Embodiment 2

The power controller 320 controls the power to be supplied to the heater 113 or the heating apparatus 100 based on the target temperature in each region of the image data. The power controller 320 controls the power to be supplied to the heater 113 or the heating apparatus 100, so that the temperature of the heater 113 or the heating apparatus 100 is maintained at the target temperature in each region of the image data. Based on the target temperature in each region of the image data, the power controller 320 changes the power to be supplied to the heater 113 or the heating apparatus 100 in each region of the recording material P corresponding to each region of the image data. For example, based on the target temperature in each of the regions 1 to 4 of the image data, the power controller 320 changes the power to be supplied to the heater 113 or the heating apparatus 100 for each of the four regions of the recording material P corresponding to each region 1 to 4 of the image data. In this case, to supply power to the heater 113 or the heating apparatus 100, the target temperature is changed in four stages at the maximum for each of the four regions of the recording material P corresponding to the regions 1 to 4 of the image data. Therefore the toner image can be fixed to the recording material P with changing the power to be supplied to the heater 113 or the heating apparatus 100 for each region of the recording material P.

Image Patterns Evaluated in Embodiment 2

In Embodiment 2, just like Embodiment 1, three types of image patterns in FIG. 5A to FIG. 5C were used to evaluate the image forming apparatus 50 of Embodiment 2. The three types of image patterns in FIG. 5A to FIG. 5C are the same as those of Embodiment 1, hence detailed description thereof is omitted.

Fixing Control of Embodiment 2

The fixing control in the cases of FIG. 5A to FIG. 5C according to Embodiment 2 will be described with reference to the flow chart in FIG. 7. The fixing control in the case of FIG. 5A according to Embodiment 2 will be described first. In the case of region 2 of the image pattern in FIG. 5A, the image in region 2 is detected as a horizontal line image that satisfies the predetermined condition, hence it is determined that the target temperature in region 2 is 200° C. In the case of region 1 of the image pattern in FIG. 5A, the printing ratio X of the solid image is 100%, hence it is determined that the target temperature in accordance with the printing ratio X in region 1 is 200° C. In the case of region 3 of the image pattern in FIG. 5A, the printing ratio X of the half-tone image is 10%, hence it is determined that the target temperature in accordance with the printing ratio X in region 3 is 185° C. In the case of region 4 of the image pattern in FIG. 5A, the printing ratio X of the text image is 4%, hence it is determined that the target temperature in accordance with the printing ratio X in region 4 is 180° C. In the case of the image pattern in FIG. 5A, the target temperature in region 1 and region 2 is 200° C., the target temperature in region 3 is 185° C., the target temperature in region 4 is 180° C., and power to be supplied to the heater 113 or the heating apparatus 100 is changed based on the target temperature in regions 1 to 4.

The fixing control in the case of FIG. 5B according to Embodiment 2 will be described next. In the case of regions 1 and 2 of the image pattern in FIG. 5B, the images in regions 1 and 2 are detected as horizontal line images that satisfy the predetermined condition, hence it is determined that the target temperature in regions 1 and 2 is 200° C. In the case of the regions 3 and 4 of the image pattern in FIG. 5B, the printing ratio X of the text image is 16%, hence it is determined that the target temperature in accordance with the printing ratio X in regions 3 and 4 is 185° C. In the case of the image pattern in FIG. 5B, the target temperature in regions 1 and 2 is 200° C., the target temperature in the regions 3 and 4 is 185° C., and the power to be supplied to the heater 113 or the heating apparatus 100 is changed based on the target temperature in the regions 1 to 4.

Finally, the fixing control in FIG. 5C according to Embodiment 2 will be described. In the case of the image pattern in FIG. 5C, the images in regions 1 to 4 are text images, and the printing ratio X of each of the text images in regions 1 to 4 is 4%. Hence it is determined that the target temperature in accordance with the printing ratio X in the regions 1 to 4 is 180° C. respectively.

Evaluation Method of Embodiment 2

Just like Embodiment 1, the three types of image patterns in FIG. 5A to FIG. 5C are printed 60 prints respectively, and the generation state of tailing, image quality other than tailing and the power consumption in this case were confirmed. To measure the power consumption, power consumed by the heater 113 of the heating apparatus 100 alone was measured by a power meter after 60 prints were printed continuously, and the integral power was regarded as the power consumption. The evaluation environment is a room temperature of 30° C. and a humidity of 80% RT.

Evaluation Result of Embodiment 2

FIG. 8 is an evaluation result of Embodiment 2. In FIG. 8, the result is better in the sequence of "VERY GOOD" and "GOOD", with "NO GOOD" indicating the worst result. In the case of Embodiment 2, in the image patterns in FIG. 5A and FIG. 5B, the generation of tailing is suppressed, and the data reproducibility is good. According to Embodiment 2, the generation of tailing can be suppressed while maintaining a high reproducibility of original data for an image pattern which includes a horizontal line image. Further, according to Embodiment 2, power consumption can be suppressed even more than Embodiment 1 while suppressing the generation of tailing, by changing the target temperature in accordance with the change of the printing ratio X of the recording material P in the conveying direction.

In Embodiment 2, in the case where a horizontal line image is included in a predetermined region (first region) of the image data, the image processor 303 determines a target temperature (second predetermined temperature) that is higher than the target temperature (first predetermined temperature) determined based on the printing ratio of the predetermined region (first region) which includes the horizontal line image. Thereby the generation of tailing can be suppressed while maintaining the image quality of the toner image formed in accordance with the image data, even if toner that allows fixing at a low temperature (low melting point toner) is used. Further, in Embodiment 2, in the case where a horizontal line image is not included in a predetermined region (second region) of the image data, the image processor 303 determines the target temperature in a predetermined region (second region) of the image data based on the printing ratio of the predetermined region (second region) of the image data. Thereby the power consumption when the toner image, which is formed in accordance with the image patterns other than a horizontal line image, is fixed to the recording material P, can be reduced.

Other Embodiments

In the description on Embodiments 1 and 2, the image processor 303 analyzes the image data on the print surface by dividing the image data into four in the conveying direction of the recording material P, but the analyzing method is not limited to this. Further, in Embodiments 1 and 2, an image in which the number of pixels in the subscanning direction is 3 to 9 (dots) and the number of pixels in the main scanning direction is at least 120 (dots) is detected as a horizontal line image. However, the detection criteria of a horizontal line image are not limited to this, and may be appropriately changed according to various conditions. If the processing speed of the image processor 303 is fast, it is preferable to optimize the determination of the target temperature by closely analyzing the vertical and horizontal connections of the images in the image data and the positions (coordinates) of the image data for each pixel.

In Embodiments 1 and 2, the configurations of the monochrome image forming apparatus 50 was described. However, the configurations of Embodiments 1 and 2 may be applied to a color image forming apparatus that prints images by superimposing four colors (yellow, magenta, cyan and black).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2019-102853, filed on May 31, 2019, which is hereby incorporated by reference herein in its entirety.

What is claimed is:

1. An image forming apparatus, comprising:
a fixing portion configured to fix a toner image formed in accordance with image data onto a recording material;
a first determining portion configured to determine, based on the image data, presence or absence of a first image in which at least a first number of pixels each having a density-related value of at least a predetermined value are continuously arrayed in a sub scanning direction, which is a conveying direction of the recording material, and in which at least a second number of pixels each having the density-related value of at least the predetermined value are continuously arrayed in a main scanning direction, which is orthogonal to the subscanning direction, the second number being greater than the first number;
a second determining portion configured to determine a target temperature at which to maintain a temperature of the fixing portion, wherein the target temperature is determined based on the presence of the first image regardless of a density-related value of the first image, in a case where a determination result by the first determining portion indicates the presence of the first image, and wherein the target temperature is determined based on a density-related value of a second image that is different from the first image, in a case where the determination result by the first determining portion indicates the absence of the first image; and
a control portion configured to control power to be supplied to the fixing portion so that the temperature of the fixing portion is maintained at the determined target temperature,
wherein a width of the first image in the subscanning direction is 120 to 380 μm, and
a width of the first image in the main scanning direction is greater than 5 mm.

2. The image forming apparatus according to claim 1, wherein the second determining portion determines a first temperature as the target temperature in the case where the determination result by the first determining portion indicates the presence of the first image, or determines a second temperature as the target temperature in the case where the determination result by the first determining portion indicates the absence of the first image, the second temperature being lower than the first temperature.

3. The image forming apparatus according to claim 1, wherein the density-related value of the second image is a printing ratio or a toner bearing amount.

4. The image forming apparatus according to claim 1, wherein the density-related value has a maximum possible value, and the predetermined value is 50% of the maximum possible value.

5. The image forming apparatus according to claim 1, wherein the first determining portion determines whether the first image is included for each of a plurality of regions generated by dividing the image data in the subscanning direction, and
the second determining portion determines the target temperature for each of the plurality of regions based on the determination result by the first determining portion.

6. The image forming apparatus according to claim 1, wherein the fixing portion includes,
a tubular film,
a heater that is provided in an inner space of the film and includes a heating element, and
a pressing roller that contacts an outer surface of the film,
the film is held between the heater and the pressing roller, and
the toner image on the recording material is heated through the film at a nip portion that formed between the film and the pressing roller.

7. The image forming apparatus according to claim 1, wherein the second determining portion determines the target temperature based on the presence of the first image regardless of the density-related value of the first image and the density-related value of the second image, in a case where the determination result by the first determining portion indicates the presence of the first image.

8. An image forming apparatus, comprising:
a fixing portion configured to fix a toner image formed in accordance with image data onto a recording material;
a first determining portion configured to determine, based on the image data, presence or absence of a first image in which at least a first number of pixels each having a density-related value of at least a predetermined value are continuously arrayed in a subscanning direction which is a conveying direction of the recording material, and in which at least a second number of pixels each having a density-related value of at least the predetermined value are continuously arrayed in a main scanning direction which is orthogonal to the subscanning direction, the second number being greater than the first number;
a second determining portion configured to determine a first temperature as a target temperature to maintain a temperature of the fixing portion regardless of a density-related value of the first image, in a case where a determination result by the first determining portion indicates the presence of the first image, or determine a second temperature as the target temperature to maintain the temperature of the fixing portion in a case where the determination result by the first determining portion indicates the absence of the first image, the second temperature being lower than the first temperature; and
a control portion configured to control power to be supplied to the fixing portion, so that the temperature of the fixing portion is maintained at the target temperature,
wherein a width of the first image in the subscanning direction is 120 to 380 μm, and
a width of the first image in the main scanning direction is greater than 5 mm.

9. The image forming apparatus according to claim 8, wherein the second determining portion determines the second temperature as the target temperature based on a printing ratio or a toner bearing amount of a second image that is different from the first image in the case where the determination result by the first determining portion indicates the absence of the first images.

10. The image forming apparatus according to claim 8, wherein the density-related value has a maximum possible value, and the predetermined value is 50% of the maximum possible value.

11. The image forming apparatus according to claim 8, wherein the first determining portion determines whether the first image is included for each of a plurality of regions generated by dividing the image data in the subscanning direction, and
the second determining portion determines the target temperature for each of the plurality of regions based on the determination result by the first determining portion.

12. The image forming apparatus according to claim 8, wherein the fixing portion includes,
a tubular film,
a heater that is provided in an inner space of the film and includes a heating element, and
a pressing roller that contacts an outer surface of the film,
the film is held between the heater and the pressing roller, and
the toner image on the recording material is heated through the film at a nip portion that formed between the film and the pressing roller.

13. The image forming apparatus according to claim 8, wherein the second determining portion determines the first temperature as the target temperature regardless of the density-related value of the first image and the density-related value of the second image, in a case where the determination result by the first determining portion indicates the presence of the first image.

14. An image forming method of an image forming apparatus including a fixing portion configured to fix a toner image formed in accordance with image data onto a recording material, the image forming method comprising:
executing, by a computer,
a first determining step of determining, based on the image data, presence or absence of a first image in which at least a first number of pixels each having density-related value of at least a predetermined value are continuously arrayed in a subscanning direction which is a conveying direction of the recording material, and in which at least a second number of pixels each having the density-related value of at least the predetermined value are continuously arrayed in a main scanning direction which is orthogonal to the subscanning direction, the second number being greater than the first number;
a second determining step of determining a target temperature at which to maintain a temperature of the fixing portion, wherein the target temperature is determined based on the presence of the first image regardless of a density-related value of the first image, in a case where a determination result in the first determining step indicates the presence of the first image, and wherein the target temperature is determined based on a density-related value of a second image that is different from the first image, in a case where the determination result in the first determining step indicates the absence of the first image; and
a control step of controlling power to be supplied to the fixing portion so that the temperature of the fixing portion is maintained at the determined target temperature,
wherein a width of the first image in the subscanning direction is 120 to 380 µm, and
a width of the first image in the main scanning direction is greater than 5 mm.

15. The image forming method according to claim 14, wherein the second determining step includes determining a first temperature as the target temperature in the case where the determination result in the first determining step indicates the presence of the first image, or determining a second temperature as the target temperature in the case where the determination result in the first determining step indicates the absence of the first image, the second temperature being lower than the first temperature.

16. The image forming method according to claim 14, wherein the density-related value of the second image is a printing ratio or a toner bearing amount.

17. The image forming method according to claim 14, wherein the density-related value has a maximum possible value, and the predetermined value is 50% of the maximum possible value.

18. The image forming method according to claim 14, wherein the first determining step includes determining whether the first image is included for each of a plurality of regions generated by dividing the image data in the subscanning direction, and
the second determining step includes determining the target temperature for each of the plurality of regions based on the determination result in the first determining step.

19. A non-transitory computer-readable recording medium for recording a program that cause a computer to execute the steps of the image forming method according to claim 14.

20. The image forming method according to claim 14, wherein the second determining step includes determining the target temperature based on the presence of the first image regardless of the density-related value of the first image and the density-related value of the second image, in a case where the determination result by the first determining portion indicates the presence of the first image.

21. An image forming method of an image forming apparatus including a fixing portion configured to fix a toner image formed in accordance with image data onto a recording material, the image forming method comprising:
executing, by a computer,
a first determining step of determining, based on the image data, presence or absence of a first image in which at least a first number of pixels each having a density-related value of at least a predetermined value are continuously arrayed in a subscanning direction which is a conveying direction of the recording material, and in which at least a second number of pixels each having a density-related value of at least the predetermined value are continuously arrayed in a main scanning direction which is orthogonal to the subscanning direction, the second number being greater than the first number;
a second determining step of determining a first temperature as a target temperature to maintain a temperature of the fixing portion regardless of a density-related value of the first image, in a case where a determination result in the first determining step indicates the presence of the first image, or determining a second temperature as the target temperature to maintain the temperature of the fixing portion in a case where the determination result in the first determining step indicates the absence of the first image, the second temperature being lower than the first temperature; and a control step of controlling power to be supplied to the fixing portion so that the temperature of the fixing portion is maintained at the target temperature, wherein a width of the first image in the subscanning direction is 120 to 380 μm, and a width of the first image in the main scanning direction is greater than 5 mm.

22. The image forming method according to claim 21, wherein the second determining step includes determining the second temperature as the target temperature based on a printing ratio or a toner bearing amount of a second image that is different from the first image in the case where the determination result in the first determining step indicates the absence of the first image.

23. The image forming method according to claim 21, wherein the density-related value has a maximum possible value, and the predetermined value is 50% of the maximum possible value.

24. The image forming method according to claim 21, wherein the first determining step includes determining whether the first image is included for each of a plurality of regions generated by dividing the image data in the subscanning direction, and the second determining step includes determining the target temperature for each of the plurality of regions based on the determination result in the first determining step.

25. A non-transitory computer-readable recording medium for recording a program that cause a computer to execute the steps of the image forming method according to claim 21.

26. The image forming method according to claim 21, wherein the second determining step includes determining the first temperature as the target temperature regardless of the density-related value of the first image and the density-related value of the second image, in a case where the determination result by the first determining portion indicates the presence of the first image.

* * * * *